(12) United States Patent
Son

(10) Patent No.: US 10,491,358 B2
(45) Date of Patent: Nov. 26, 2019

(54) METHOD AND APPARATUS TO RECEIVE AND TRANSMIT DATA IN A MOBILE COMMUNICATION SYSTEM

(71) Applicant: Yeongmoon Son, Yongin-si (KR)

(72) Inventor: Yeongmoon Son, Yongin-si (KR)

( * ) Notice: Subject to any disclaimer, the term of this patent is extended or adjusted under 35 U.S.C. 154(b) by 0 days.

(21) Appl. No.: 16/189,945

(22) Filed: Nov. 13, 2018

(65) Prior Publication Data

US 2019/0149308 A1 May 16, 2019

Related U.S. Application Data

(60) Provisional application No. 62/585,526, filed on Nov. 13, 2017.

(51) Int. Cl.
*H04L 5/00* (2006.01)
*H04W 76/27* (2018.01)
*H04L 27/26* (2006.01)

(52) U.S. Cl.
CPC .......... *H04L 5/0092* (2013.01); *H04L 5/0007* (2013.01); *H04L 5/0053* (2013.01); *H04L 5/0094* (2013.01); *H04L 27/2601* (2013.01); *H04L 27/2666* (2013.01); *H04W 76/27* (2018.02)

(58) Field of Classification Search
CPC ... H04L 5/0092; H04L 5/0094; H04L 5/0053; H04L 27/2601; H04W 76/27
See application file for complete search history.

(56) References Cited

U.S. PATENT DOCUMENTS

2015/0189574 A1* 7/2015 Ng .................. H04W 24/08
370/252

* cited by examiner

*Primary Examiner* — Kabir A Timory
(74) *Attorney, Agent, or Firm* — Novick, Kim & Lee, PLLC; Sang Ho Lee

(57) ABSTRACT

Data transfer method and apparatus for use in a mobile communication system are provided. Method to acquire system information blocks includes receiving MIB from a base station, receiving SIB1 from the base station based on parameter included in the MIB, determining SIBs to be requested based on information received in SIB 1, determining SIB group to be requested based on information received in SIB 1 and SIBs to be requested, determining the preamble to be used for requesting SIB group based on information received in SIB 1 and transmitting the determined preamble to request the determined SIB group.

16 Claims, 17 Drawing Sheets

METHOD AND APPARATUS TO RECEIVE AND TRANSMIT DATA IN A MOBILE COMMUNICATION SYSTEM

CROSS-REFERENCE TO RELATED APPLICATION

This application claims the priority and benefit of U.S. Provisional Patent Application No. 62/585,526, filed Nov. 13, 2017, the disclosure of which is incorporated herein by reference.

BACKGROUND OF THE INVENTION

1. Field of the Invention

The present disclosure relates to a mobile communication system with multiple subcarrier spacings. More specifically, the present disclosure relates to a system information acquisition method and an apparatus for use in the mobile communication system with multiple subcarrier spacings.

2. Description of the Related Art

Mobile communication systems were developed to provide mobile users with communication services. With rapid technological advancements, the mobile communication systems have evolved to the level capable of providing high speed data communication service fulfilling various QoS requirements.

In the mobile communication system called NR (Next Radio) which is being developed, to support various QoS requirement in various deployment scenarios, multiple subcarrier spacing need to be supported in a given serving cell, a given frequency or a given frequency band.

OFDM based mobile communication systems so far use only a single subcarrier spacing and NR is the first mobile communication system using multiple subcarrier spacings. In addition, system information is essential information for UE to commence data transfer in the NR cell. UE is required to acquire necessary system information to commence necessary communication in a NR cell. Part of system information can be transmitted in different SCS comparing to the SCS used for MIB transmission. Part of system information can be transmitted upon request from UE.

Therefore, a need exists for a method and an apparatus for facilitating system information acquisition in OFDM based mobile communication system with multiple subcarrier spacings where part of system information is provided in on-demand manner.

SUMMARY

Aspects of the present disclosure are to address at least the above mentioned problems. Accordingly, an aspect of the present disclosure is to provide a method and an apparatus for facilitating system information acquisition in OFDM based mobile communication system with multiple subcarrier spacings.

In accordance with an aspect of the present disclosure, a system information acquisition method of a terminal in mobile communication system with multiple subcarrier spacings is provided. In the method, terminal acquires $1^{st}$ information to determine the SCS for SIB1 acquisition, acquires $2^{nd}$ information, $3^{rd}$ information and $4^{th}$ information from SIB1, determine the SIBs to be requested based on the $2^{nd}$ information, determine the SIB group to be requested based on the $3^{rd}$ information, determine the preamble to request the determined SIB group based on $4^{th}$ information, transmits the determined preamble and receives the requested SIB group.

DETAILED DESCRIPTION

Figure 1A:
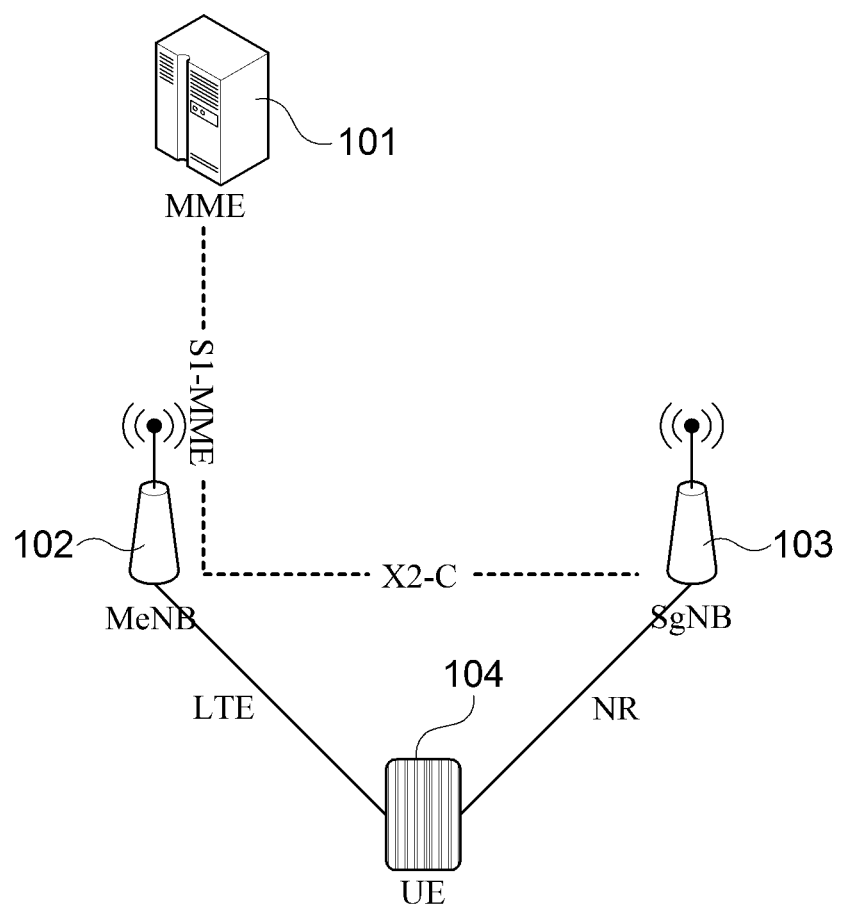
FIGS. 1A and 1B are a diagram illustrating a mobile communication system architecture according to various embodiments of the present disclosure.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

The following description with reference to the accompanying drawings is provided to assist in a comprehensive understanding of various embodiments of the present disclosures as defined by the claims and their equivalents.

Terminologies used in the disclosures are explained below. Numerology defines a specific time duration e.g. the length of an OFDM symbol. Numerology and subcarrier spacing (hereafter SCS) have one to one relationship. In LTE, SCS is 15 KHz and the length of an OFDM symbol is $1/14$ ms. In NR, SCS is either 15 KHz, 30 KHz, 60 KHz, 120 KHz or 240 KHz. The length of an OFDM symbol is inverse proportional to SCS. SCS, numerology and symbol length are corresponding each other and interchangeable in the disclosures. Subframe is time unit with 1 ms duration. Time slot (or slot) is time unit consisting with N symbols. N is either 7 or 14. Frame structure has same meaning as duplex mode. FS1 is FDD and FS2 is TDD.

Figure 1B:
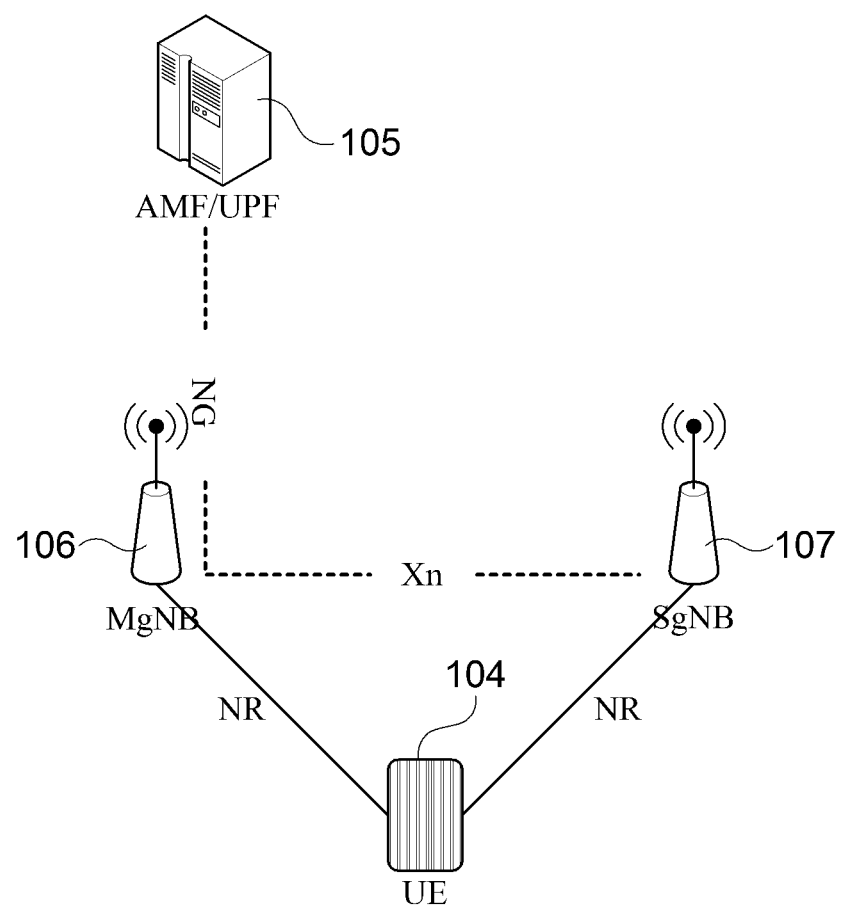

FIGS. 1A and 1B are a diagram illustrating a mobile communication system architecture according to various embodiments of the present disclosure.

Referring to FIGS. 1A and 1B, MME 101 is connected to MeNB (102) via S1 interface. SgNB 103 is connected to MeNB 102 via X2 interface. UE is connected to MeNB 102 and SgNB 103 via a specific radio interface/RAT. UE transmit and receive data with MeNB via a group of cells. The RAT of those cells is LTE/E-UTRA. The group of cells used for communication with MeNB is the 1st cell group (or Master Cell Group). UE transmit and receive data with SgNB via another group of cells. The RAT of those cells is NR. The group of cells used for communication with SgNB is the 2nd cell group (or Secondary Cell Group).

The mobile communication system explained above is called EN-DC (LTE NR Dual Connectivity). It is possible that UE is connected to only NR cells. AMF/UPF 105 is connected with MgNB 106 or with gNB via NG interface. The interface between gNBs is called Xn.

Referring to FIGS. 1A and 1B, base station is illustrated as a single node. In the real implementation, base station can be comprised of plurality of nodes. For example, a central unit and plurality of distributed unit can be comprised of a single base station and plurality of cells controlled by the base station.

Figure 2:
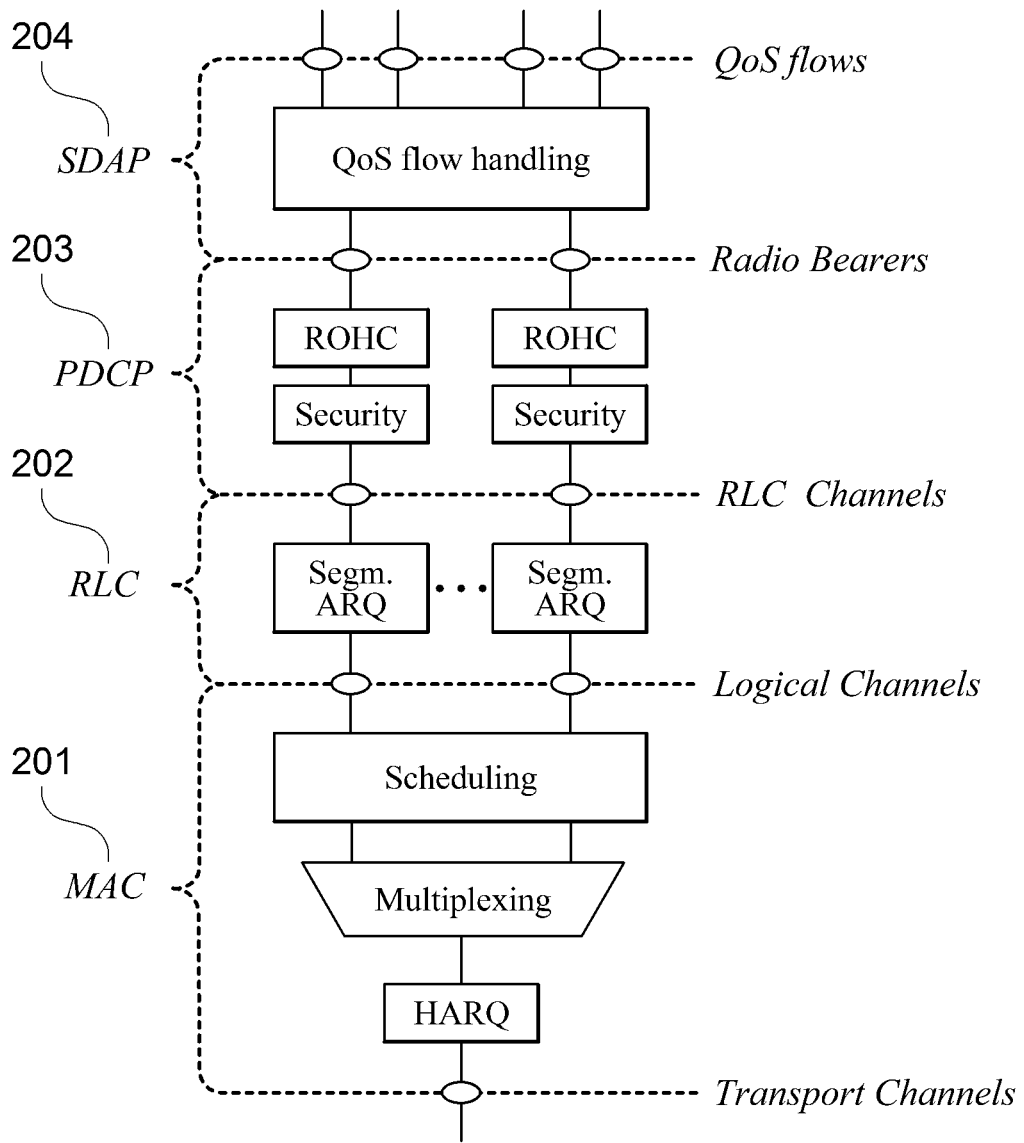
FIG. 2 is a diagram illustrating a protocol stack of a mobile communication system according to various embodiments of the present disclosure.

FIG. 2 is a diagram illustrating a protocol stack of a mobile communication system according to various embodiments of the present disclosure;

Referring to FIG. 2, Protocol stack of UE and base station is comprised of MAC 201, RLC 202, PDCP 203, SDAP 204. Multiple QoS flow/IP packet flows input to SDAP which distribute the IP packet to the appropriate PDCP. The RRC control message between UE and base station is exchanged via SRB (Signaling Radio Bearer). User data/IP packet between UE and base station is exchanged via DRB (Data Radio Bearer). Radio bearer is comprised of PDCP and RLC.

SDAP (Service Data Adaptation Protocol) layer handles QoS per data/service. More specifically, SDAP distribute IP packet received from the upper layer to the appropriate DRB. SDAP inspects SDAP header of the received SDAP PDU to apply reflective QoS. More details on reflective QoS can be found in TS 38.300.

PDCP (Packet Data Convergence Protocol) layer performs header compression/decompression, ciphering/deciphering and integrity protection. PDCP provides temporary lossless data transfer for the case where RLC cannot guarantee lossless data transfer.

RLC (Radio Link Control) layer process the RLC SDU received from PDCP to make the RLC PDU and submit it to the MAC layer. RLC layer performs ARQ (Automatic Retransmission Request) for RLC SDUs to ensure lossless data transfer.

MAC (Medium Access Control) layer multiplexes RLC PDUs, generated by multiple radio bearers configured in the UE, into MAC PDU and submit it to the physical layer. MAC layer demultiplexes RLC PDUs from MAC PDU and forward them to appropriate RLC entity. MAC performs specific operations required for data transfer with base station like random access or uplink timing adjustment.

1$^{st}$ Embodiment

Figure 3:
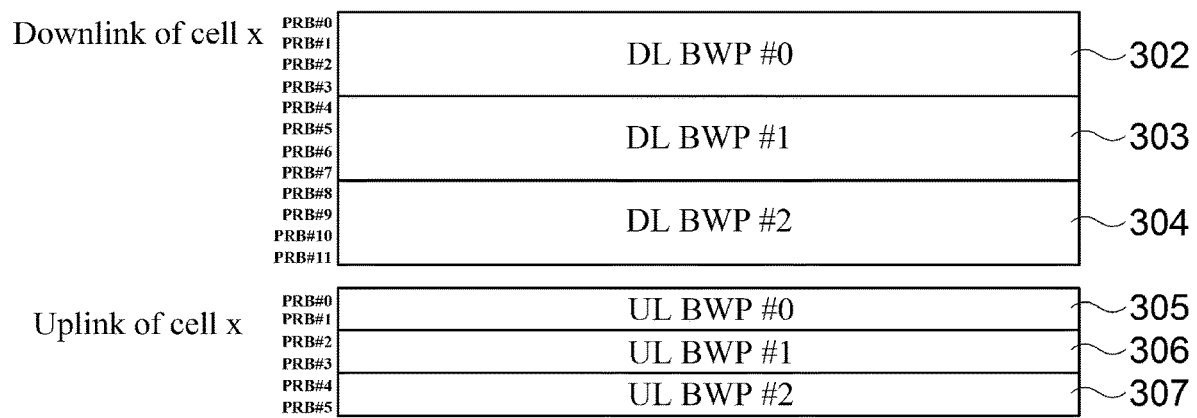
FIG. 3 is a diagram illustrating BWP in a mobile communication system.

In NR, a cell can consist of one or more than one BWPs. BWP is the group of contiguous PRBs. Referring to FIG. 3, cell x consists of 3 DL BWPs and 3 UL BWPs. DL BWP #0 302 consists of PRB #0~PRB #3. DL BWP #1 303 consists of PRB #4~PRB #7. DL BWP #2 304 consists of PRB #8~PRB #11. UL BWP #0 consists of PRB #0~PRB #1. UL BWP #1 306 consists of PRB #2~PRB #3. UL BWP #2 307 consists of PRB #4~PRB #5.

UE can be configured with multiple BWPs of a serving cell via RRC signaling. In UE perspective, configured BWP can be either in activated state or in deactivated state. Only one BWP can be in activated state for a UE.

Activation/deactivation of BWP can be controlled by DCI. For example, if UE with the DL BWP #0 being currently activated receives DCI scheduling DL PRB of other BWP (e.g. PRB #4), then activated DL BWP of the UE changes from DL BWP #0 to the other DL BWP (DL BWP #1 in this case). Likewise, if UE with the UL BWP #0 being currently activated receive DCI scheduling UL PRB of other BWP (e.g. PRB #4), then activated UL BWP of the UE changes from UL BWP #0 to the other UL BWP (UL BWP #2 in this case).

In FDD, DL BWP and UL BWP are switched independently i.e. when DL BWP #0 and UL BWP #0 are the activated BWPs for the UE at a certain point of time, activated DL BWP can be switched to e.g. DL BWP #2 while activated UL BWP is kept same.

In TDD and for limited capability UEs, switching DL BWP and UL BWP together is more beneficial. In TDD, DL and UL are used in the same frequency region, hence if DL BWP and UL BWP does not change together, UE may be required to change its RF upon every DL-UL change or UL-DL change.

The decision whether to associate a certain DL BWP and a certain UL BWP and to manage them together (e.g. switch them together) or to handle DL BWP and UL BWP independently should be made by GNB taking UE RF capability into account. It is also related with FBG which the serving cell's FB belongs to (i.e. whether the serving cell is the FDD cell or TDD cell).

To support traffic like VoIP where small packets with similar sizes are generated regularly, semi-persistent resources for the first HARQ transmissions can be allocated to UEs. SPS is characterized as below.

RRC defines the periodicity of the semi-persistent downlink assignment/uplink grant and others like the number of HARQ processes etc.;
PDCCH indicates whether the downlink assignment/the uplink grant is a semi-persistent one i.e. whether it can be implicitly reused in the following TTIs according to the periodicity defined by RRC.

When required, retransmissions are explicitly signaled via the PDCCH(s).

Below, UL SPS operation is briefly described.

1: GNB transmits a RRC message to configure UL SPS. The message includes SPS configuration information like SPS periodicity, the number of HARQ process and SPS C-RNTI.

2: GNB activates UL SPS by sending PDCCH indicating the TB (Transport Block) size, MCS, PRB (Physical Resource Block) and other information for UL SPS. The PDCCH is addressed by SPS C-RNTI which is different from C-RNTI.

3: UE initialize the UL SPS resource considering the UL SPS periodicity and the timing when UL SPS activation command is received. If UL SPS activation command is received at t1, then configured UL grant occurs at t1+t2+N*SPS periodicity, where N is integer starting from 0. t2 is the time distance between UL grant and corresponding PUSCH transmission. t2 can be either indicated in the UL SPS activation command or in the RRC message received in step 1 as part of UL SPS configuration information.

4: UE transmit PUSCH for the initial uplink transmission in the configured UL grant if UE has data to transmit. If there is no data to transmit, UE does not perform PUSCH transmission in a given configured UL grant.

5: GNB deactivates UL SPS resource by sending PDCCH indicating SPS release.

6: UE sends SPS confirmation MAC Control Element to confirm that UE release the configured UL grant.

When UL SPS is released, GNB shall be able to allocate the released resource to other UE. For this, GNB needs to know if PDCCH indicating SPS release is successfully received by UE. This is the reason why UE sends SPS confirmation MAC Control Element.

UL SPS resource can be released either by PDCCH indicating SPS release or by UL BWP switching i.e. UL BWP is switched to the BWP where the SPS resource is not configured. For example, SPS is activated in UL BWP #2 at t1 and UL BWP is switched to UL BWP #3 at t2, then SPS is released at t2. If the release is due to UL BWP switching, additional UL resource is required in the new UL BWP for UE to send SPS confirmation MAC Control Element, while UE can use the configured UL grant before releasing it in case of SPS release by PDCCH. Due to this, it is better to send SPS confirmation MAC Control Element only if it is because of received PDCCH indicating UL SPS release.

Figure 4:
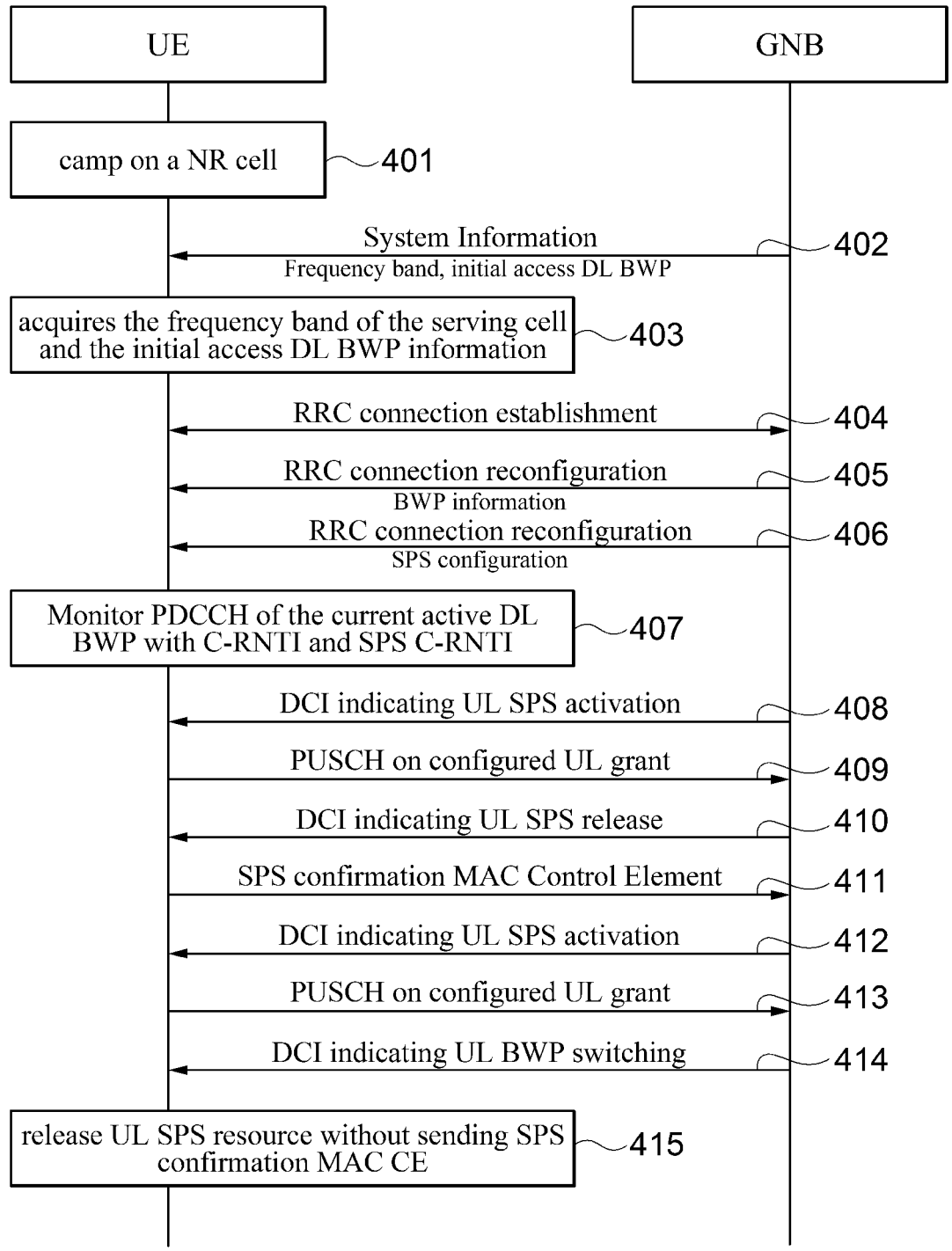
FIG. 4 is a signal flow diagram illustrating a procedure for transmitting and receiving signals at a UE and base station in a mobile communication system according to the $1^{st}$ embodiment of the present disclosure.

FIG. 4 is a signal flow diagram illustrating a procedure for transmitting and receiving signals at a UE and base station in a mobile communication system according to the 1$^{st}$ embodiment of the present disclosure.

UE camp on a NR cell 401 and receives system information from the cell 402. UE acquires from the received system information the frequency band of the serving cell and the initial access DL BWP configuration 403. Alternatively, UE can determine whether the serving cell belongs to FBG 1 or FBG2 during downlink synchronization procedure where UE receives PSS/SSS in the NR-SS blocks. If UE acquires the duplex mode of the cell during the synchronization procedure, UE determines that the cell is FBG 1 cell if it is FDD cell and that the cell is FBG 2 cell if it TDD cell. Initial access DL BWP is the BWP where UE can perform the initial random access procedure.

UE establishes RRC connection with GNB by performing random access procedure 404. UE transmits random access preamble, receives random access response, transmit Msg 3 which include RRCConnectionRequest message and receives Msg 4 which include RRCConnectionSetup message. UE uses initial access BWP to receive random access response and RRCConnectionSetup message.

GNB sends UE RRCConnectionReconfiguration message to establish BWPs 405. The message includes multiple of BWP information. If the frequency band of the serving cell belongs to FBG 1 (i.e. serving cell is FDD cell), each BWP information includes both DL BWP information and UL BWP information. DL BWP and UL BWP can be switched separately. If the frequency band of serving cell belongs to FBG 2 (i.e. serving cell is TDD cell), BWP information include a single BWP information which is applied to both DL BWP and UL BWP. DL BWP and UL BWP configured with a single BWP information are considered as associated, and associated DL BWP and UL BWP are switched together.

FBG 1 is the group of FDD frequency bands. FBIs (Frequency Band Indicator) of frequency bands belonging to band group 1 are contiguous and smaller than a certain value. FBG 2 is the group of TDD frequency bands. FBIs of frequency bands belonging to band group 2 are contiguous and equal to or greater than a certain value. Frequency Bands and associated FBIs are defined in TS38.101.

GNB sends RRCConnectionReconfiguration message to provide SPS configuration information 406. UE monitors the PDCCH (DCI) of the current active DL BWP 407. UE monitors the PDCCH with C-RNTI for dynamic scheduling and with SPS C-RNTI for SPS scheduling. C-RNTI is allocated during RRC connection establishment procedure. GNB sends UE PDCCH (DCI) indicating UL SPS activation 408. UE determines configured UL grant occasions based on the UL SPS periodicity and the time when PDCCH indicating UL SPS activation is received.

UE transmits and GNB receives PUSCH, if UE has data for transmission, in the configured UL grant at configured UL grant occasions 409. GNB sends UE PDCCH (DCI) indicating UL SPS release 410. UE determines to release the configured UL resource and sends SPS confirmation MAC Control Element using the configured UL grant and release the configured UL resource after sending the MAC CE 411.

After some time, GNB sends UE PDCCH (DCI) indicating UL SPS activation to activate UL SPS again 412. UE transmit and GNB receives PUSCH, if UE has data for transmission, in the newly configured UL grant at configured UL grant occasions 413. GNB sends UE PDCCH (DCI) indicating UL BWP switching where the new UL BWP does not include the frequency resource/PRB where UL SPS is configured 414. UE determines to release UL SPS resource and release the UL SPS resource without sending SPS confirmation MAC CE 415.

Figure 5:
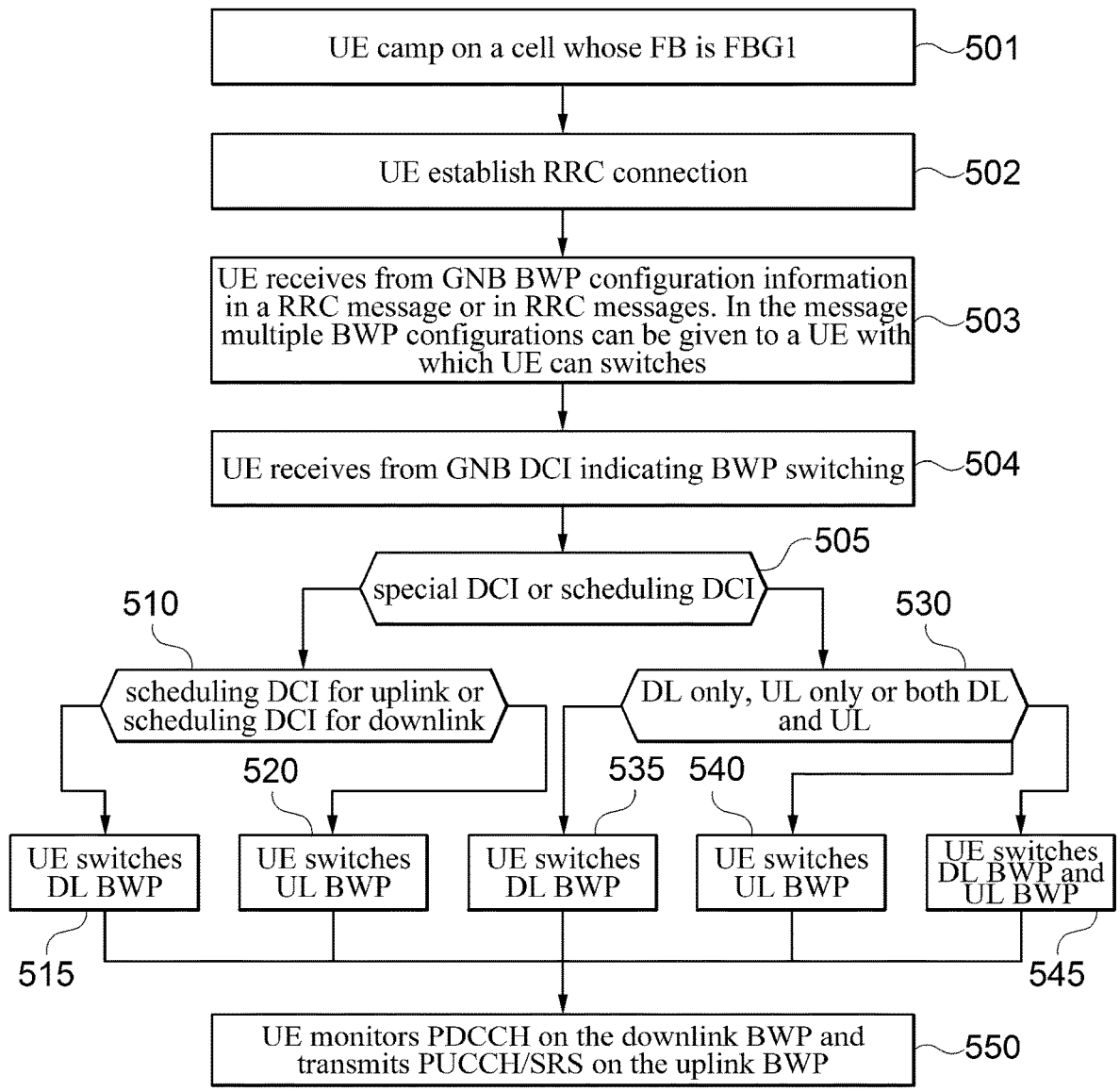
FIG. 5 is the block diagram illustrating the BWP switching operation of a UE when the serving cell belongs to FBG 1.

FIG. 5 is the block diagram illustrating the BWP switching operation of a UE when the serving cell belongs to FBG 1.

UE camp on a cell (which becomes the serving cell for the UE after then) whose FB belongs to FBG1 501. UE determines whether the serving cell's FB is FBG1 or FBG2 from system information (RMSI) or during synchronization procedure. FB is indicated in RMSI. UE establish RRC connection in the serving cell 502. UE receives from GNB BWP configuration information in a RRC message or RRC messages 503. In the message multiple BWP configurations can be provided to a UE with which UE can switches based on GNB's instruction.

UE receives from GNB DCI indicating BWP switching 504. UE checks if the DCI is special DCI or scheduling DCI 505. If it is scheduling DCI, UE goes to 510. If it is special DCI, UE goes to 530.

BWP switching can be instructed either by special DCI or scheduling DCI. Scheduling DCI is the DCI scheduling uplink resource (or granting uplink resource, i.e. uplink PRBs) which belongs to the other UL BWP than the current BWP. For example, UE's current serving BWP is BWP #1, and if UE receives scheduling DCI indicating UL PRB that belong to BWP #2, the UL BWP switches to BWP #2. If scheduled UL resource/UL PRB belongs to multiple BWPs (e.g. BWP #x consists of PRB #0~PRB #3 and BWP #y consists of PRB #2 and PRB #3, then PRB #2 and PRB #3 belongs to both BWP #x and BWP #y), then UE selects the BWP according to a predefined rule (or switches to a BWP according to a predefined rule). The predefined rule can be e.g. to select the BWP (or switch to the BWP) having smaller PRBs (or narrower bandwidth). In the example above, if DCI grants UL PRB #3, then UE switches to BWP #y, if not already in BWP #y, because BWP #y has smaller number of PRBs. Alternatively, UE can select the BWP with lower index (or higher index).

UE behavior can be defined as below when DCI is received and the DCI schedules UE with PRB(s) belonging to the multiple BWPs 1: UE selects/stays in the current serving BWP if the all the scheduled PRB(s) is/are within the current serving BWP.

2: If any of the scheduled PRB(s) is/are not within the current serving BWP (i.e. at least one PRB is not within the current serving BWP), UE selects the BWP with the lowest BWP id (or highest BWP id) amongst the BWPs Instead of 2, 2' can be applied.

2': If any of the scheduled PRB(s) is/are not within the current serving BWP (i.e. at least one PRB is not within the current serving BWP), UE selects the BWP having most PRBs (or having least PRBs) amongst the BWPs UE checks if it is the scheduling DCI for uplink or scheduling DCI for downlink (i.e. whether it is downlink assignment or uplink grant) 510. If it is downlink assignment, UE goes to 515. If it is uplink grant, UE goes to 520.

UE switches DL BWP to the BWP where the downlink assignment indicates (or scheduled downlink PRB belongs to) 515 and goes to 550. If the downlink assignment belongs to multiple DL BWPs, UE selects a DL BWP based on a predefined rule and switches to the selected DL BWP.

UE switches UL BWP to the BWP where the uplink grant indicates (or allocated uplink PRB belongs to) 520 and goes to 550. If the uplink grant belongs to multiple UL BWPs, UE selects a UL BWP based on a predefined rule and switches to the selected UL BWP.

Special DCI is the DCI instructing BWP switching without assigning/granting downlink/uplink PRB(s). UE checks if the special DCI indicates to switch either the DL BWP only, the UL BWP only or the DL BWP and UL BWP together 530. Special DCI is the DCI indicating BWP switching without allocating/granting resource. A specific field of the special DCI indicates whether it is for downlink, uplink or both. UE goes to 535 if it is only for downlink. UE goes to 540 if it is only for uplink. UE goes to 545 if it is both for downlink and uplink.

UE switches DL BWP to the BWP as indicated in the special DCI 535 and go to 550. UE switches UL BWP to the BWP as indicated in the special DCI 540 and go to 550. UE switches DL BWP and UL BWP to the DL BWP and the UL BWP as indicated in the special DCI 545 and go to 550.

UE monitors PDCCH on the downlink BWP and transmits PUCCH/SRS on the uplink BWP 550.

Figure 6:
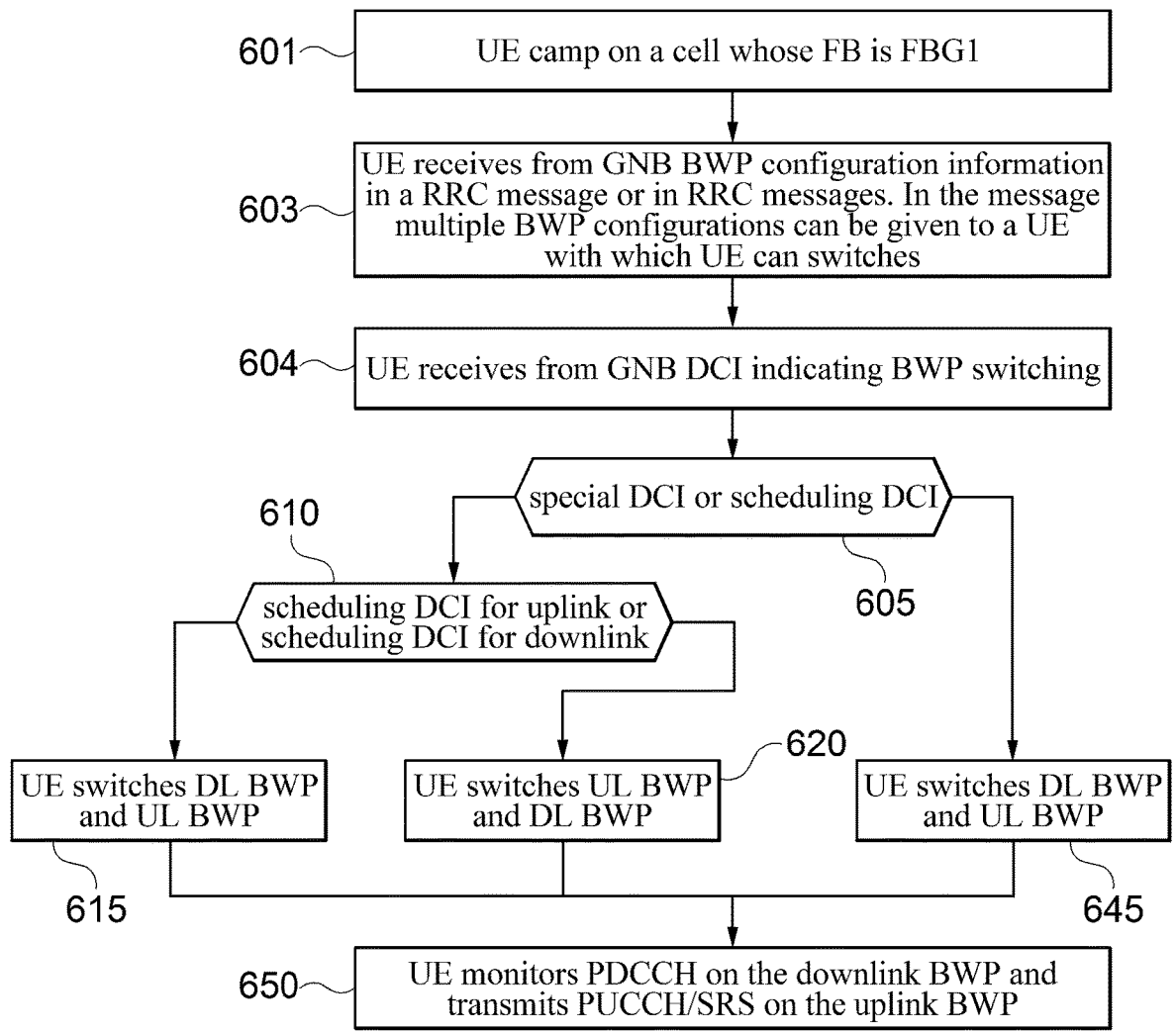
FIG. 6 is the block diagram illustrating the BWP switching operation of a UE when the serving cell belongs to FBG 2.

FIG. 6 is the block diagram illustrating the BWP switching operation of a UE when the serving cell belongs to FBG 2.

UE camp on a cell whose FB is FBG1 601. UE is handed over to a serving cell whose FB belongs FBG2 (i.e. to a TDD cell). UE receives from GNB BWP configuration information in a RRC message or RRC messages 603. In the message multiple BWP configurations can be given to a UE with which UE can switches UE receives from GNB DCI indicating BWP switching 604. UE checks if the DCI is the special DCI or scheduling DCI 605. If it is a scheduling DCI, UE goes to 610. If it is a special DCI, UE goes to 645.

UE checks if it is the scheduling DCI for uplink or scheduling DCI for downlink (i.e. if it is downlink assignment or uplink grant) 610. If it is downlink assignment, UE goes to 615. If it is uplink grant, UE goes to 620.

UE switches DL BWP to the BWP where the downlink assignment indicates (or scheduled downlink PRB belongs to) and switches UL BWP to the associated UL BWP of the switched DL BWP 615. The associated DL BWP and UL BWP are assigned with a same BWP id. UE goes to 650.

A DL BWP and a UL BWP are associated BWPs if they are configured on the same frequency region and are allocated with the same BWP id. For example, if DL BWP #1 and UL BWP #1 consists with PRB #0~PRB #3, then DL BWP #1 and UL BWP #1 are associated with each other.

UE switches UL BWP to the BWP where the uplink grant indicates (or allocated uplink PRB belongs to) and switches DL BWP to the associated DL BWP of the switched UL BWP 620. UE goes to 650.

UE switches DL BWP and UL BWP to the DL BWP and the UL BWP as indicated in the special DCI 645 and goes to 650.

UE monitors PDCCH on the downlink BWP and transmits PUCCH/SRS on the uplink BWP 650.

Figure 7:
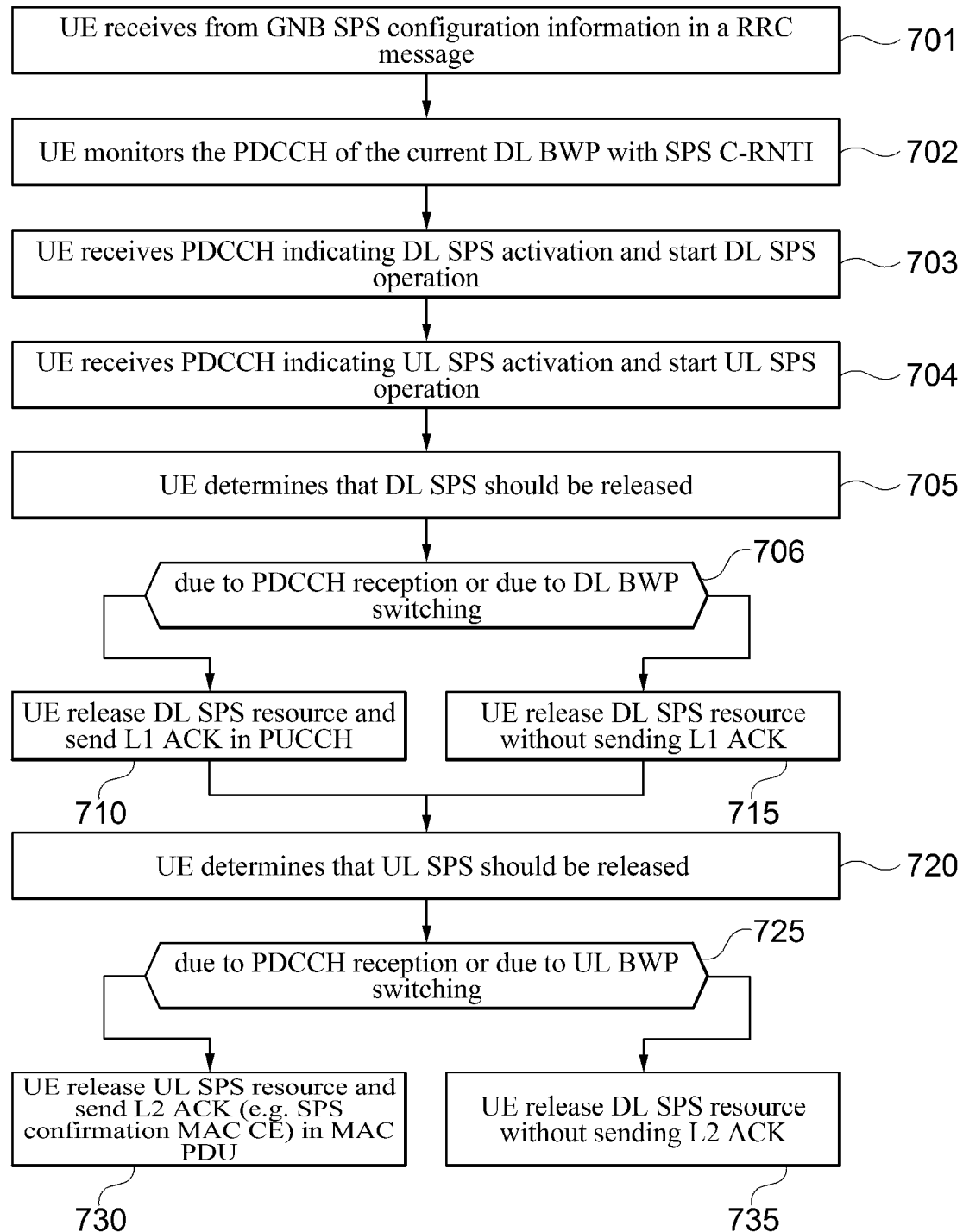
FIG. 7 is the block diagram illustrating the SPS release operation of a UE when BWP switches.

FIG. 7 is the block diagram illustrating the SPS release operation of a UE when BWP switches;

UE receives from GNB SPS configuration information in a RRC message 701. UE monitors the PDCCH of the current DL BWP with SPS C-RNTI 702. UE receives PDCCH indicating DL SPS activation and start DL SPS operation 703. UE receives PDCCH indicating UL SPS activation and start UL SPS operation 704. At some point of time UE determines that DL SPS should be released 705.

UE checks if the DL SPS release is due to PDCCH reception or due to DL BWP switching 706. If due to PDCCH reception (i.e. because DL SPS deactivation command is received, or DCI indicating SPS release is received), UE goes to 710. If due to DL BWP switching, UE goes to 715.

UE release DL SPS resource and send Layer 1 ACK in PUCCH 710. Layer 1 ACK is sent on PUCCH. DCI/PDCCH indicating SPS release include implicit information regarding PUCCH resource where L1 ACK is transmitted.

UE release DL SPS resource without sending Layer 1 ACK 715.

UE determines that UL SPS should be released 720. UE checks if the UL SPS release is due to PDCCH reception (i.e. UL SPS release is indicated in the DCI/PDCCH for SPS C-RNTI) or due to UL BWP switching 725. If due to PDCCH reception, UE goes to 730. If due to UL BWP switching, UE goes to 735.

UE release UL SPS resource and send MAC PDU including Layer 2 ACK (e.g. SPS confirmation MAC CE) 730. UE release UL SPS resource without sending Layer 2 ACK 735.

Figure 8:
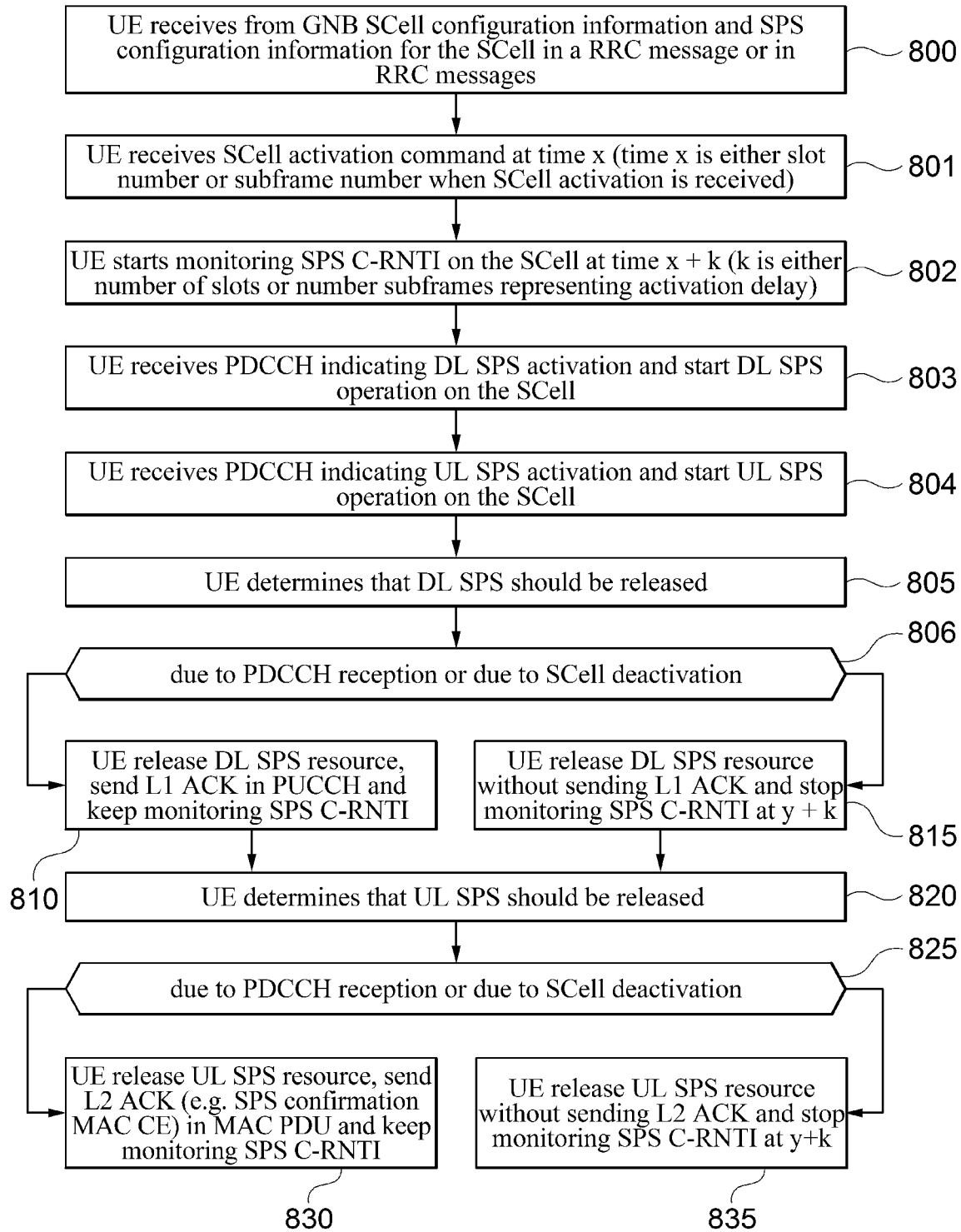
FIG. 8 is the block diagram illustrating the SPS release operation of a UE when the SCell is deactivated.

FIG. 8 is the block diagram illustrating the SPS release operation of a UE when the SCell is deactivated If UE is configured with multiple carriers/serving cells (i.e. in carrier aggregation), SCell deactivation may affect SPS operation. Especially if SPS is configured in a SCell, then UE and GNB should have the same understanding on from which point of time UE shall monitor SPS C-RNTI upon SCell activation and deactivation.

UE receives from GNB Scell configuration information and SPS configuration information for the SCell in a RRC message or RRC messages 800.

UE receives Scell activation command at time x (time x is either slot number or subframe number when Scell activation command is received) 801. SCell activation command (or Activation/Deactivation MAC control element) is identified by a MAC subheader with a specific LCID and has a fixed size (either one byte or four byte). Activation/Deactivation MAC CE include information regarding which SCell is in active state and which SCell is in deactivated state.

UE starts monitoring SPS C-RNTI on the Scell from time x+k (k is either number of slots or number subframes representing activation delay) if Activation/Deactivation MAC CE indicates the activation of SCell where SPS is configured (i.e. Ci of SCell where SPS is configured is set to one. Ci is defined in 38.321) 802. UE receives PDCCH indicating DL SPS activation and start DL SPS operation on the SCell 803. UE receives PDCCH indicating UL SPS activation and start UL SPS operation on the SCell 804.

At some point of time UE determines that DL SPS should be released 805. UE checks if the DL SPS release is due to PDCCH reception or due to Scell deactivation 806. If due to PDCCH reception, UE goes to 810. If due to Scell deactivation, UE goes to 815. UE release DL SPS resource, send L1 ACK in PUCCH and keep monitoring SPS C-RNTI 810.

UE release DL SPS resource without sending L1 ACK and stop monitoring SPS C-RNTI at y+k (y is either slot number or subframe number when Scell deactivation command is received and k is the number of slots/subframes representing the Scell deactivation delay) 815. Both x, y and k are hardcoded in the specification and in the UE memory.

UE determines that UL SPS should be released 820. UE checks if the UL SPS release is due to PDCCH reception or due to SCell deactivation 825. If due to PDCCH reception, UE goes to 830. If due to SCell deactivation, UE goes to 835.

UE release UL SPS resource, send MAC PDU including L2 ACK (e.g. SPS confirmation MAC CE) and keep monitoring SPS C-RNTI 830.

UE release UL SPS resource without sending L2 ACK and stop monitoring SPS C-RNTI at y+k 835.

In this invention DL SPS resource and configured assignment are same. UL SPS resource and configured grants are same. "activate" and "initialize" are same. "deactivate" and "release" are same.

$2^{nd}$ Embodiment

LCP is the procedure distributing the allocated UL resource to the relevant logical channels. RRC controls the LCP by giving each logical channel a priority, a prioritized bit rate (PBR), and a buffer size duration (BSD).

LCP procedure ensures that the UE serves the logical channel(s) in the following sequence:
1. All relevant logical channels in decreasing priority order up to their PBR;
2. All relevant logical channels in decreasing priority order for the remaining resources assigned by the grant.

In NR, significantly different traffic like eMBB and URLLC are served by a UE. Then, it is important that the logical channel for a certain traffic is served by appropriate resource for that traffic.

In the disclosure, to achieve above, logical channel restriction is configured per logical channel.

Figure 9:
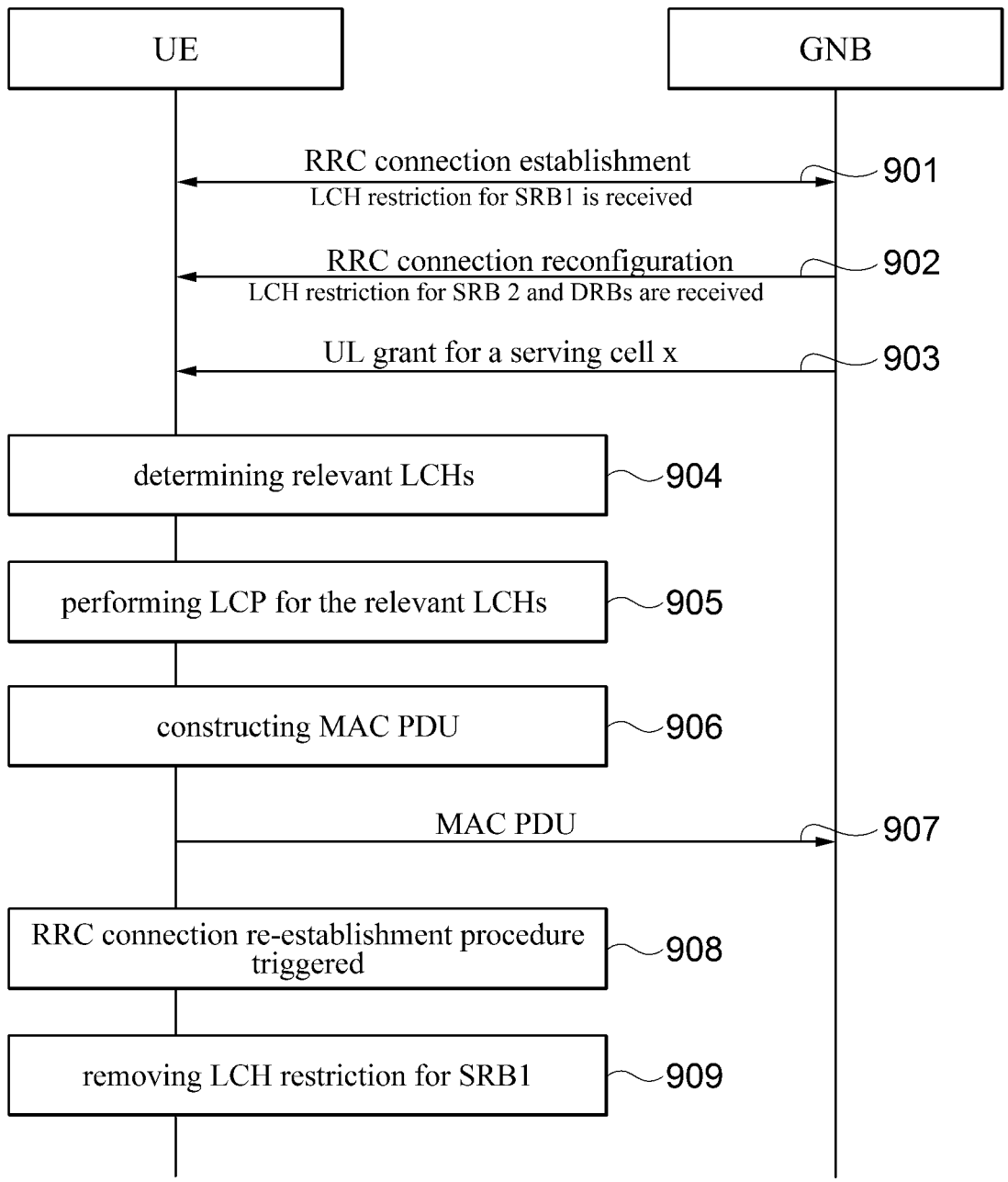
FIG. 9 is a signal flow diagram illustrating a procedure for transmitting and receiving signals at a UE and base station in a mobile communication system according to the 2nd embodiment of the present disclosure.

FIG. 9 is a signal flow diagram illustrating a procedure for transmitting and receiving signals at a UE and base station in a mobile communication system according to the 2nd embodiment of the present disclosure;

UE establishes RRC connection with GNB and receives LCH restriction for SRB1 901. If LCH restriction for SRB1 is not included in the RRC connection setup message, SRB1 is the relevant logical channel for any uplink grant regardless of from which serving cell the UL grant is received for and how long the PUSCH transmission duration is.

UE receives RRC connection reconfiguration message from GNB within which LCH restriction for SRB 2 and DRBs are included 902. LCH restriction information for a RB consists of allowed cell list and maximum PUSCH duration. Allowed cell list is the list of serving cell configured for the UE where data of the corresponding LCH is allowed to be transmitted. If a LCH is allowed to be transmitted in all serving cells, instead of signaling full list of serving cells, allowed cell list is not signaled for the LCH to reduce the signaling overhead. Maximum PUSCH duration is signaled in the unit of ms (or fraction of ms). It is the threshold to determine whether the corresponding LCH can be transmitted in the PUSCH. If the PUSCH duration of the PUSCH scheduled by an UL grant is smaller than the maximum PUSCH duration of the LCH, the LCH can be transmitted on the PUSCH granted by the UL grant. Otherwise, the LCH shall not be transmitted on the PUSCH. The maximum PUSCH duration can be signaled/configured per LCH, and if it is not signaled/configured for a LCH, then the LCH (or the data of the LCH) can be transmitted for any PUSCH duration. Maximum PUSCH duration is signaled/configured as multiple of ms or fraction of ms. For example, maximum PUSCH duration for a LCH x is configured to be 1 ms and maximum PUSCH duration for LCH y is configured to be $1/56$ ms.

UL grant for a serving cell x is received by UE 903. UL grant for a serving cell x is the UL grant scheduling UL resource of serving cell x (or scheduling PUSCH transmission on serving cell x).

UE determines the relevant LCHs for the UL grant 904. LCHs passing serving cell test and duration test are considered as relevant LCHs. UE can perform serving cell test first and duration test next or vice versa. Following LCHs are considered passing the serving cell test for an UL grant.

- LCHs whose allowed cell list include the serving cell where UL grant is received for (i.e. allowed cell list of LCH x ⊃ Serving cell y where UL grant is received for); or
- LCHs for which allowed cell list is not signaled.

Following LCHs are considered passing PUSCH duration test for a UL grant.

- LCHs whose maximum PUSCH duration is greater than or equal to the actual PUSCH duration of the UL grant (Maximum PUSCH duration threshold of LCH x≥Actual PUSCH duration (in ms or in fraction of ms) of the PUSCH scheduled by the UL grant); or
- LCHs for which maximum PUSCH duration is not signaled.

The actual PUSCH duration is determined by the number of symbols/slots of the PUSCH and the SCS of the UL BWP where PUSCH is transmitted. The length of a symbol and of a slot are different depending on the SCS of the UL BWP where PUSCH is scheduled/transmitted. Table 1 shows the length of symbol, of slot per SCS.

TABLE 1

| SCS | 15 KHz | 30 KHz | 60 KHz | 120 KHz | 240 KHz |
| --- | --- | --- | --- | --- | --- |
| symbol length | $1/14$ ms | $1/28$ ms | $1/56$ ms | $1/112$ ms | $1/224$ ms |
| slot length | 1 ms | 0.5 ms | ms | 0.125 ms | 0.0625 ms |

The number of slots/symbols where PUSCH transmission take place can be different case by case and indicated in the DCI.

For PUSCH duration test, UE consider, to determine the actual PUSCH duration, the SCS of the UL BWP for the PUSCH transmission and the number of slots/symbols of the PUSCH transmission. For example, if the SCS of the PUSCH transmission is 15 KHz and the PUSCH transmission occupies 2 slots, then the PUSCH transmission duration is 2 ms. If the SCS is 120 KHz and the PUSCH transmission occupies 2 symbols, then the PUSCH transmission duration is $1/56$ ms.

UE compares the maximum PUSCH transmission of each LCH and the actual PUSCH transmission duration to determine which LCH passes the test.

UE performs LCP taking relevant LCHs into account 905. UE constructs MAC PDU with the data of the relevant LCHs 906. If needed, UE includes padding BSR in the MAC PDU. Padding BSR includes BS of all LCHs including both relevant LCHs and irrelevant LCHs (LCHs having not considered in the LCP).

UE transmits MAC PDU to the GNB 907. Due to certain events (e.g. RLF), UE triggers RRC connection re-establishment procedure 908. RRC connection re-establishment procedure and RLF are specified in TS38.331.

UE removes/suspends certain LCH restrictions for certain RBs 909. For example, cell restriction is removed/suspended for SRB1 to avoid delay that will occur if LCH restriction is not removed.

Figure 10:
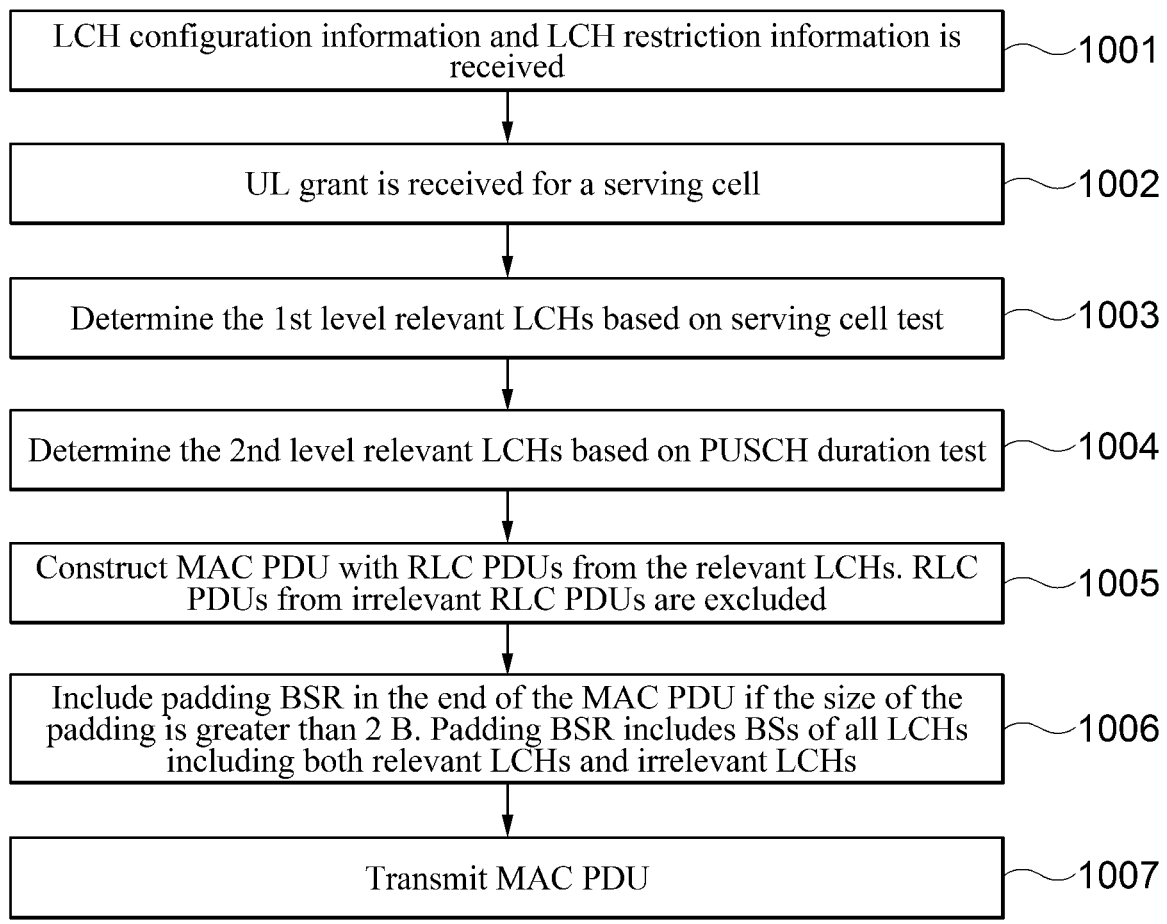
FIG. 10 is the block diagram illustrating the MAC PDU construction operation of a UE.

FIG. 10 is the block diagram illustrating the MAC PDU construction operation of a UE.

LCH configuration information and LCH restriction information is received 1001. UL grant is received for a serving cell 1002. UE determine the 1st set of relevant LCHs based on serving cell test 1003. UE determine the 2nd set of relevant LCHs based on PUSCH duration test 1004. UE first calculate the actual PUSCH duration by multiplying the number of symbols/slots for the PUSCH transmission by the actual length of symbols/slots in the UL BWP and compare it with PUSCH duration of the UL grant.

UE construct MAC PDU with RLC PDUs from the relevant LCHs 1005. RLC PDUs from irrelevant RLC PDUs are not included in the MAC PDU. The relevant LCHs are the LCHs passed both serving cell test and PUSCH duration test.

UE include padding BSR in the end of the MAC PDU taking into account the number of padding bits and the number of LCGs having data available for transmission as shown in the table below 1006. Padding BSR includes/reports BSs of all LCHs including both relevant LCHs and irrelevant LCHs. Table 2 summarizes which padding BSR type is chosen in a given scenario.

TABLE 2

| number of padding bits (=x) | number of LCGs having data available for transmission | Padding BSR type |
| --- | --- | --- |
| Short BSR + subheader <= x | zero (i.e. empty buffers for all LCGs) | Short BSR (LCG id = 0 or lowest index, BS = 0) |

TABLE 2-continued

| number of padding bits (=x) | number of LCGs having data available for transmission | Padding BSR type |
|---|---|---|
| Long BSR + subheader <= x | zero | Short BSR |
| Short BSR + subheader <= x < Long BSR + subheader | One | Short BSR |
| Long BSR + subheader <= x | One | Long BSR |
| Short BSR + subheader <= x < Long BSR + subheader | More than one | Short BSR |
| Long BSR + subheader <= x | More than one | Long BSR |

As seen in the table x, the format of padding BSR (whether Short BSR or Long BSR) is determined based on the number of padding bits if at least one LCG has data available for transmission. But if there is no LCG having data available for transmission (i.e. empty buffers), short BSR is reported regardless of the size of padding bit. This rule reduces the complexity of UE implementation. The reason why Short BSR is reported even when there is no data available for transmission is because reporting Short BSR helps GNB to know that UE has no data for transmission. Short BSR, Long BSR and LCG are defined in TS 38.321.

UE transmit MAC PDU 1007.

3$^{rd}$ Embodiment

In EN-DC, UE performs LTE DRX operation for LTE MCG and NR DRX operation for NR MCG. To continue HARQ retransmission during DRX operation, UE uses two types of timers; HARQ RTT timer and retransmissionTimer. Due to the difference between LTE and NR (LTE uses a single numerology and NR uses multiple numerologies), the handling of those timers shall be different in LTE DRX operation and in NR DRX operation.

Figure 11:
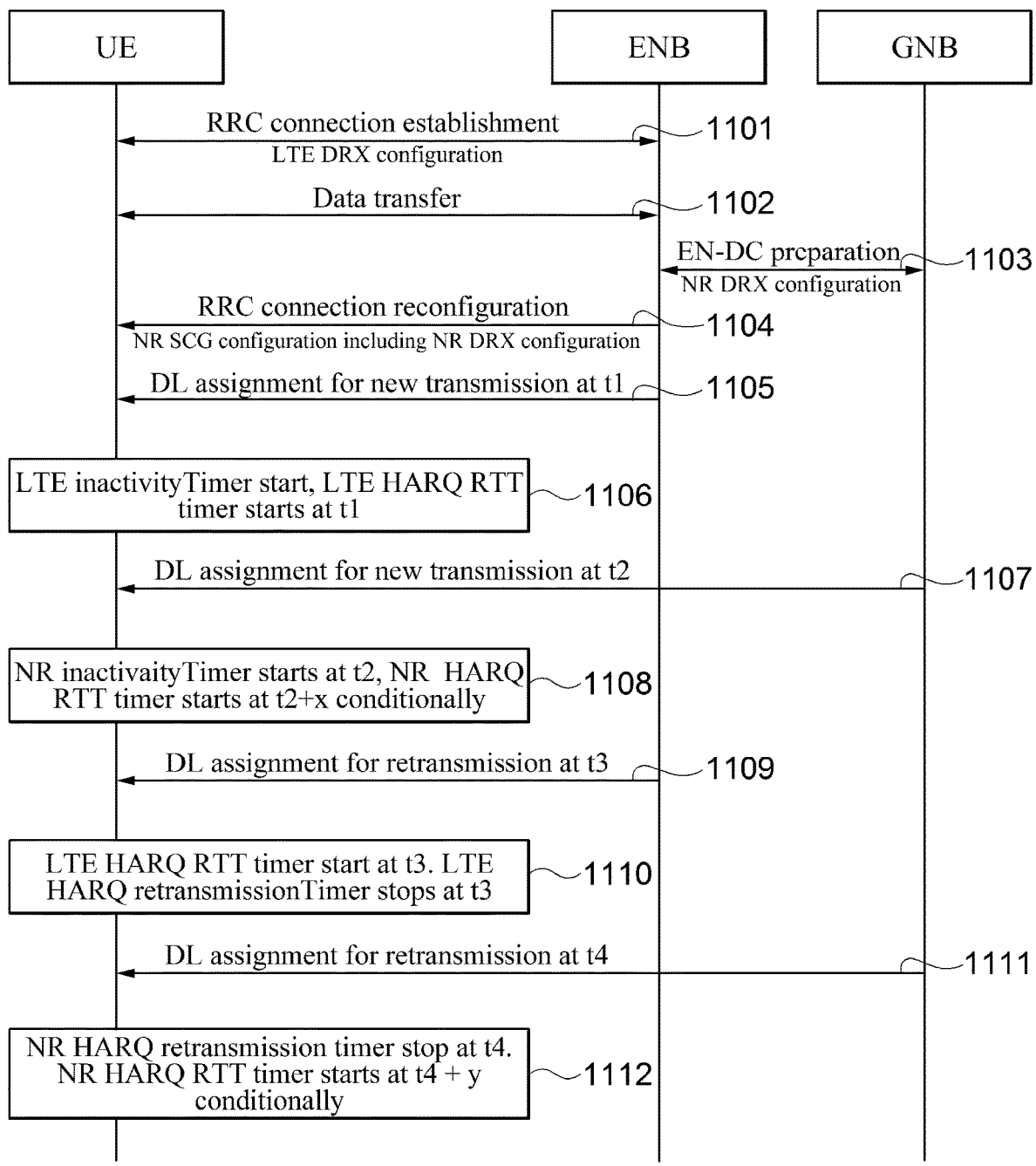
FIG. 11 is a signal flow diagram illustrating a procedure for transmitting and receiving signals at a UE and base station in a mobile communication system according to the 3rd embodiment of the present disclosure.

FIG. 11 is a signal flow diagram illustrating a procedure for transmitting and receiving signals at a UE and base station in a mobile communication system according to the 3rd embodiment of the present disclosure.

UE establish RRC connection in LTE serving cell. During the procedure, LTE DRX configuration can be indicated to the UE in RRC connection setup message 1101. UE and ENB perform data transfer, wherein LTE DRX operation based on LTE DRX configuration is performed 1102.

ENB decides to setup EN DC for the UE. ENB performs EN-DC preparation procedure with GNB 1103. During the procedure, ENB and GNB exchanges X2 control message, and the X2 message from the GNB to ENB contains NR DRX configuration.

ENB sends RRC connection reconfiguration to UE to establish EN DC 1104. The RRC message can contain NR configuration including NR DRX configuration, which is forwarded from GNB. UE configure EN DC and start NR DRX operation for SCG.

UE receives DL assignment for new transmission at t1 in LTE cell (MCG cell) from MeNB 1105 and starts LTE incativityTimer and LTE HARQ RTT timer at t1 1106.

UE receives DL assignment for new transmission at t2 in NR cell (SCG cell) from SgNB 1107 and starts NR inactivaityTimer at t2 and conditionally NR HARQ RTT timer at t2+x 1108. x is number of slots in/of UL BWP where PUCCH/HARQ feedback is transmitted. x indicates the slot where HARQ feedback is transmitted and is signaled in the DCI/PDCCH where DL assignment is include/signaled. NR HARQ RTT timer starts if the HARQ feedback is NACK or corresponding TB is not decoded successfully. If CBG (CodeBlockGroup) retransmission is enabled, NR HARQ RTT timer starts if HARQ feedback for at least one CBG is NACK.

UE receives DL assignment for retransmission at t3 in LTE cell (MCG cell) from MeNB 1109. UE starts LTE HARQ RTT timer and stops LTE HARQ retransmission-Timer at t3 1110. HARQ RTT timer starts at the beginning of t3 and HARQ retransmittionTimer stops at the end of t3.

UE receives DL assignment for retransmission at t4 in NR cell (SCG cell) from SgNB 1111. UE stops NR HARQ retransmission timer at t4 and conditionally starts NR HARQ RTT timer at t4+x 1112.

Figure 12:
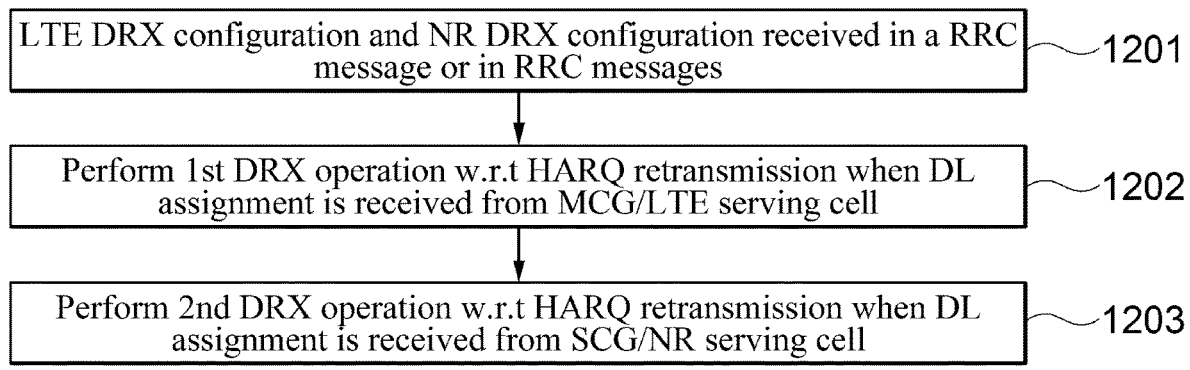
FIG. 12 is the block diagram illustrating the DRX operation of a UE configured with EN DC.

FIG. 12 is the block diagram illustrating the DRX operation of a UE configured with EN DC.

UE receives LTE DRX configuration and NR DRX configuration in a RRC message or in RRC messages 1201.

UE perform 1st DRX operation w.r.t HARQ retransmission when DL assignment is received from MCG/LTE serving cell 1202. 1$^{st}$ DRX operation w.r.t HARQ retransmission is as following. UE stops, for the corresponding HARQ process, retransmissionTimer and starts HARQ RTT timer in the same subframe when DL assignment is received. HARQ RTT timer has fixed value and the value/length of retransmisstionTimer is configured by RRC message. The unit of retransmissionTimer and HARQ RTT timer is same and is subframe.

UE perform 2nd DRX operation w.r.t HARQ retransmission when DL assignment is received from SCG/NR serving cell 1203. 2$^{nd}$ DRX operation w.r.t HARQ retransmission is as following. UE stops, for the corresponding HARQ process, retransmissionTimer in the subframe when DL assignment is received. UE starts, for the corresponding HARQ process and if the TB is not decoded successfully, HARQ RTT timer in the DL slot n+x. n is the slot number when the DL assignment is received. x is the time distance between DL assignment and the corresponding HARQ feedback. x is signaled in the DCI/PDCCH or in the RRC message. The unit of x is the slot of the UL BWP where HARQ feedback is transmitted. The value/length of HARQ RTT timer is configured by RRC. The value/length of retransmission-Timer is configured by RRC. The unit of retransmission-Timer and HARQ RTT timer is fraction of subframe.

4$^{th}$ Embodiment

System Information is broadcasted in the entire cell periodically. It is important to manage overhead due to system information in acceptable level. To achieve this, this embodiment provides system information structure and proper UE behavior in acquiring system information.

Figure 13:
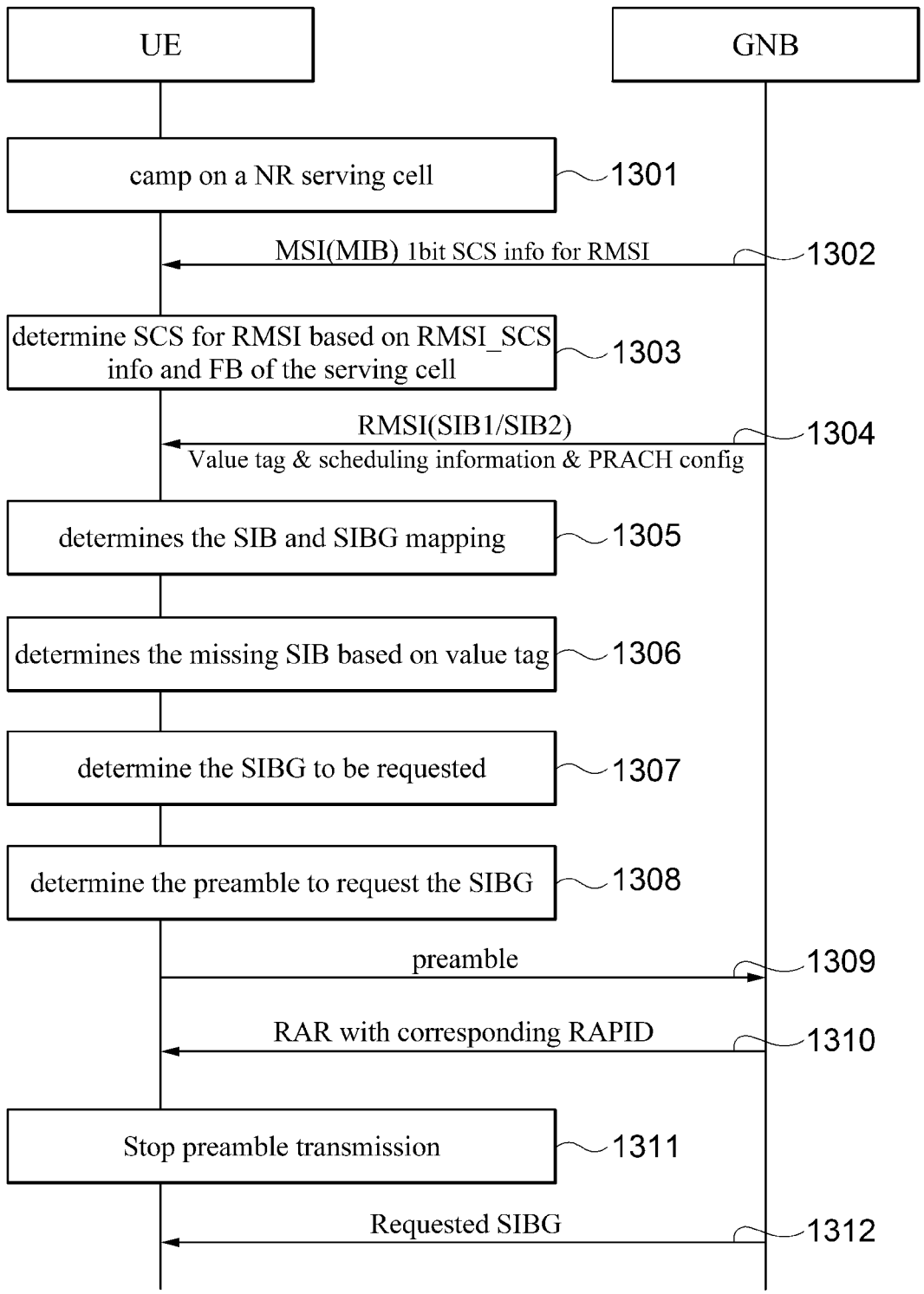
FIG. 13 is a signal flow diagram illustrating a procedure for transmitting and receiving signals at a UE and base station in a mobile communication system according to the 4th embodiment of the present disclosure.

FIG. 13 is a signal flow diagram illustrating a procedure for transmitting and receiving signals at a UE and base station in a mobile communication system according to the 4th embodiment of the present disclosure UE camp on a NR serving cell 1301. GNB transmits and UE receives MSI 1302. MSI includes 1-bit SCS info for RMSI. SCS info for RMSI (hereafter RMSI_SCS) is the SCS to be used/applied in receiving RMSI.

UE determine SCS for RMSI based on RMSI_SCS and FB of the serving cell (or the center frequency of the serving cell, or the center frequency of the SS-block, or the frequency of SS/PBCH block) 1303. If FB of the serving cell belong to frequency region 1 (FB whose upper frequency is below a certain threshold), the first code point (value) of the RMSI_SCS is 15 KHz and the second code point (value) of the RMSI_SCS is 30 KHz. If FB of the serving cell belong to frequency region 2 (FB whose lower frequency is above a certain threshold), the first code point (value) of the RMSI_SCS is 60 KHz and the second code point (value) of the RMSI_SCS is 120 KHz. The threshold is hard-coded/specified in the specification. The threshold can be 6 GHz. Alternatively, following rule can be applied in determining RMSI_SCS. If the center frequency of the serving cell (or the center frequency of SS-block/Synch Signal) is below a certain threshold, the first code point (value) of the RMSI_SCS is 15 KHz and the second code point (value) of the RMSI_SCS is 30 KHz. If the center frequency of the serving cell (or the center frequency of SS-block/Synch Signal) is above a certain threshold, the first code point (value) of the RMSI_SCS is 60 KHz and the second code point (value) of the RMSI_SCS is 120 KHz.

GNB transmits and UE receives RMSI 1304. RMSI includes value tags for each SIB, scheduling information and PRACH configuration.

UE determines the SIB and SIBG mapping (i.e. which SIB belongs to which SIBG) based on the received scheduling information 1305. Scheduling information includes the mapping information between SIBs and SIBG and the time domain scheduling information of each SIBG. SIBG is the container for multiple SIBs having the same repetition periodicity.

UE determines the missing SIB by comparing the stored value tag and received value tag 1306. If the stored value tag of a SIB and the received value tag of the SIB are different, the SIB is the missing SIB. Value tag is an integer representing the contents of the SIB. The minimum value and the maximum value of the value tag is specified in the specification. Value tag can be called by different name like version index.

UE determine the SIBG to be requested based on the missing SIBs and the SIBG-SIB mapping information 1307. UE determine the preamble to request the SIBG 1308. The mapping information between SIBG and the corresponding preamble can be broadcasted in the system information.

The mapping can be implicit and determined by certain rule and the received mapping information as below. Only the starting preamble and the number of preambles are signaled in the system information. Then UE determines the mapping based on the number of SIBGs, the order of SIBGs and the preambles for SIBG request. The first preamble of the preambles for the SIBG request (if not the last preamble) is mapped with the first SIBG. The second preamble of the preambles for the SIBG request (if not the last preamble) is mapped with the second SIBG. The nth preamble of the preambles for the SIBG request (if not the last preamble) is mapped with the nth SIBG. The last/special preamble of the preambles for the SIBG request is mapped with the all the SIBGs.

If UE determines that SIB m and SIB n are missing (i.e. the stored SIB m and SIB n are different from SIB m and SIB n used in this serving cell), and based on SIB-SIBG mapping information, determines that SIB m and SIB n are mapped with kth SIBG, then UE selects kth preamble among the preambles reserved for SIBG request. If kth preamble does not exist (i.e. the number of preambles for SIBG request is smaller than k), UE selects the last/special preamble.

If UE determines that multiple SIBs are missing and the SIBs are mapped with different SIBGs, UE selects the last/special preamble. If the last/special preamble is detected by GNB, GNB broadcasts all the SIBGs.

As seen above, the special preamble indicates more than one (or all) SIBGs are requested. Other preamble(s) indicates a specific SIBG is requested. The order of the preamble and the requested SIB(s) are determined according to a specific rule. Special preamble is the last preamble (with the highest RAPID amongst the preambles for SIBG request).

UE transmit the selected preamble and GNB detects it 1309. GNB transmits and UE receives RAR with the corresponding RAPID 1310. The corresponding RAPID is the RAPID corresponding to the preamble selected and transmitted. UE stop preamble transmission 1311 and monitor PDCCH to receive requested SIBG.

GNB transmits and UE receives SIBGs conveying missing SIBs 1312. UE stores the received SIBs with associated value tags.

Figure 14:
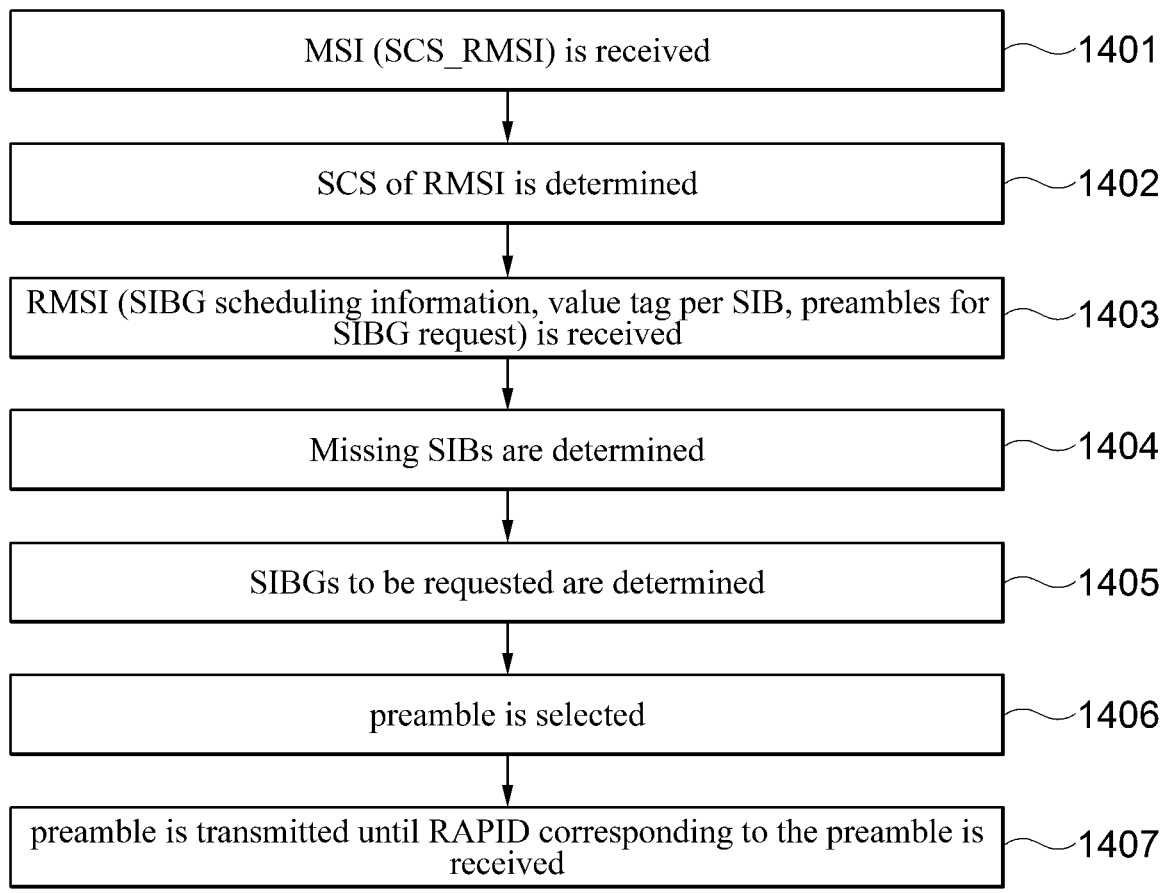
FIG. 14 is the block diagram illustrating the SI request operation of a UE.

FIG. 14 is the block diagram illustrating the SI request operation of a UE

UE receives MSI (SCS_RMSI) 1401. SCS of RMSI is determined based on the frequency of the serving cell and the SCS_RMSI 1402. RMSI (SIBG scheduling information, value tag per SIB, preambles for SIBG request) is received based on the determined SCS of the RMSI 1403. Missing SIBs are determined based on the received value tags and stored value tags 1404. SIBGs to be requested are determined based on the missing SIBs and SIB-SIBG mapping information 1405. Preamble is selected based on the determined SIBGs to be requested and the preambles for SIBG request 1406. Preamble is transmitted until RAPID corresponding to the preamble is received 1407.

Figure 15:
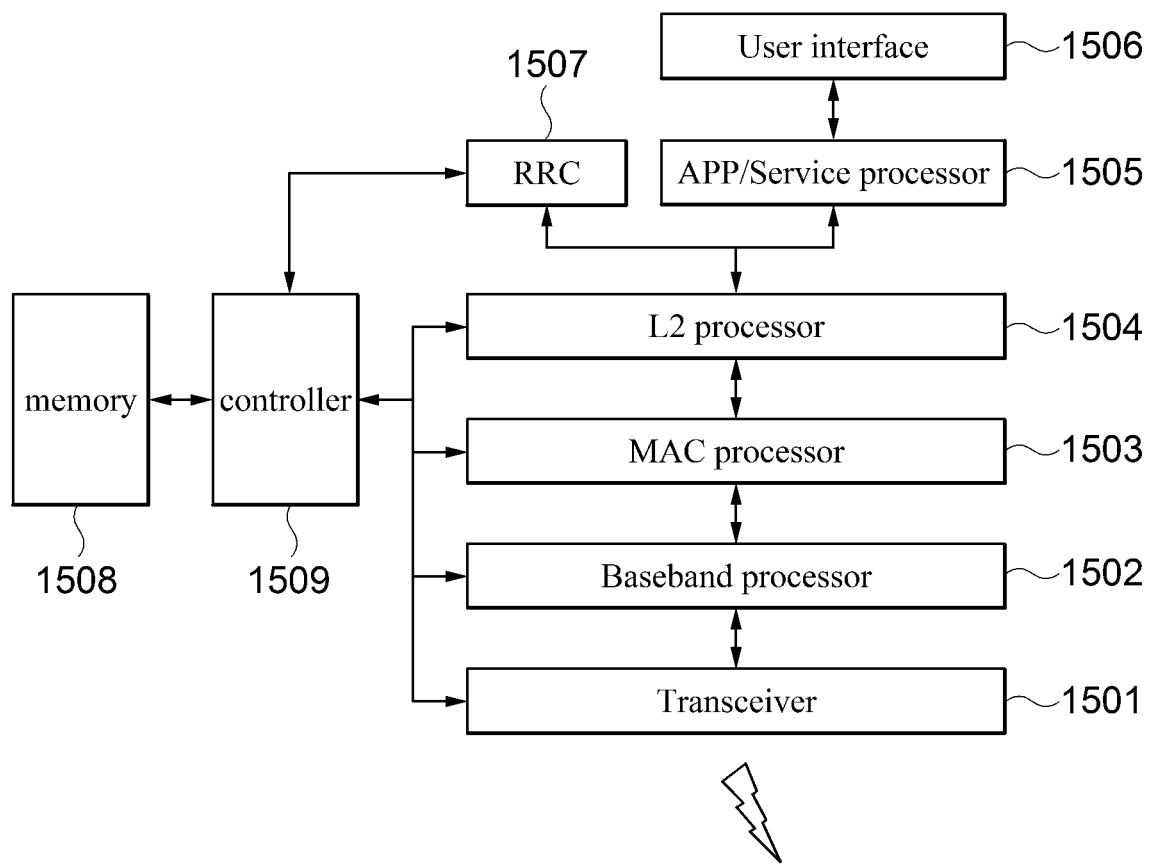
FIG. 15 is a block diagram illustrating a configuration of a terminal (UE) according to various embodiments of the present disclosure.

FIG. 15 is a block diagram illustrating a configuration of a terminal (UE) according to various embodiments of the present disclosure;

UE consists of transceiver 1501, baseband processor 1502, MAC processer 1503, Layer 2 processor 1504, Application/service processor 1505, user interface 1506, RRC processor 1507, memory 1508 and controller 1509.

Transceiver process the signal received from baseband processor for transmission or process the received signal and forward it to baseband processor.

Baseband processor process (i.e. scrambling, channel coding, modulation etc.) bit stream received from MAC processor to send it to transceiver or process the received the signal from the transceiver to forward it to MAC processor.

MAC processor multiplexes RLC PDUs from L2 processor into MAC PDU or demultiplexes MAC PDU to RLC PDUs to forward them to L2 processor. It forward MAC control element to controller or multiplex MAC control element into MAC PDU.

L2 processor consists of RLC processor and PDCP processor. L2 processor process RRC message from RRC processor into RLC PDU and process IP packet from application/service processor into RLC PDU, or vice versa.

Application/service processor processes the input from user interface and generate and forward IP packets to L2 processor for transmission. Application/service processor processes IP packets received from L2 processor and forward relevant to user interface.

User interface consist of display, virtual key board, speaker and microphone, and interact with user.

Memory stores necessary information forwarded from the controller and deliver necessary information to controller based on controller's instruction.

Controller controls the mobile communication in general. UE behavior/operation depicted in the FIGS. 4, 5, 6, 7, 8, 9, 10, 11, 12, 13 and 14 are controlled by controller.

Figure 16:
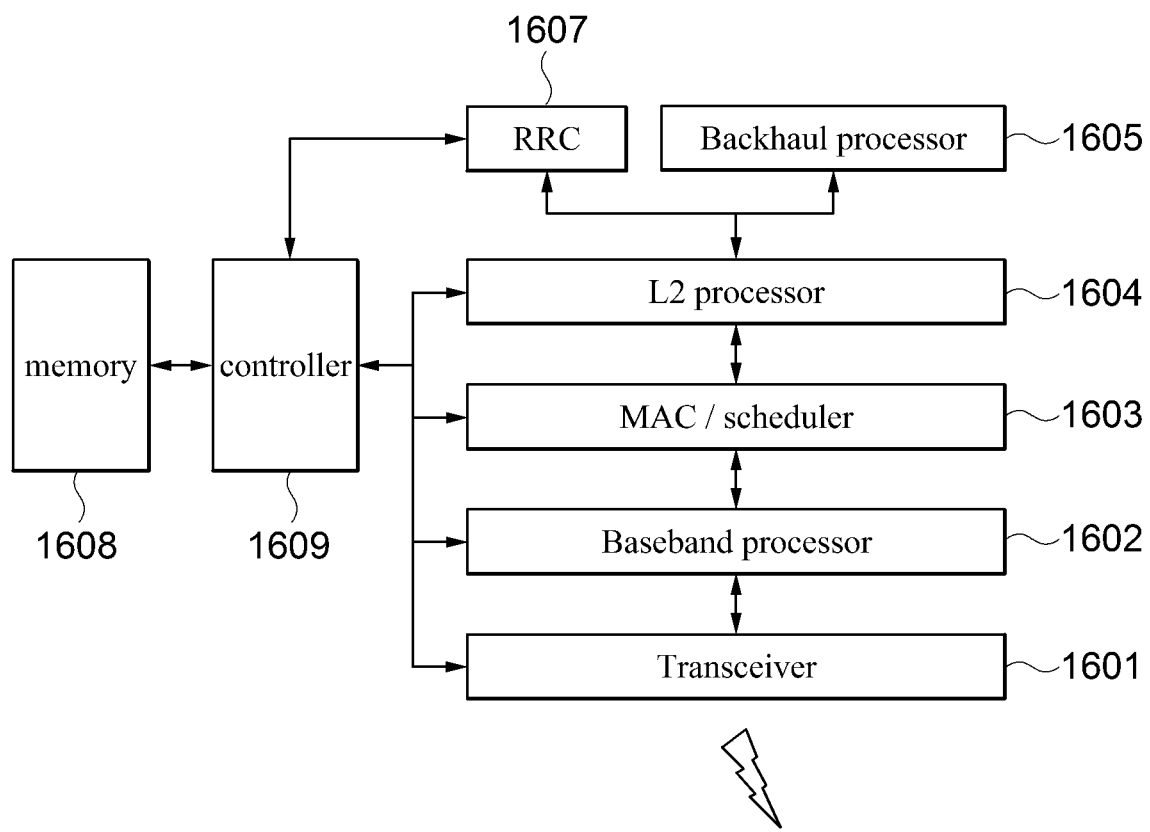
FIG. 16 is a block diagram illustrating a configuration of a base station (Node B) according to various embodiments of the present disclosure.

FIG. 16 is a block diagram illustrating a configuration of a base station (Node B) according to various embodiments of the present disclosure.

Node B consists of transceiver 1601, baseband processor 1602, MAC processor/scheduler 1603, Layer 2 processor 1604, backhaul processor 1605, RRC processor 1607, memory 1608 and controller 1609.

Transceiver process the signal received from baseband processor for transmission or process the received signal to forward it to baseband processor.

Baseband processor process (i.e. scrambling, channel coding, modulation etc.) bit stream received from MAC processor to send it to transceiver or process the received the signal from the transceiver to forward it to MAC processor.

MAC processor multiplexes RLC PDUs from L2 processor into MAC PDU or demultiplexes MAC PDU to RLC PDUs to forward them to L2 processor. It forward MAC control element to controller or multiplex MAC control element into MAC PDU.

Scheduler allocate resource to UEs in the cells controlled by the scheduler.

L2 processor consists of RLC processor and PDCP processor. L2 processor process RRC message from RRC processor into RLC PDU and process IP packet from backhaul processor into RLC PDU, or vice versa.

Backhaul processor communicate with core network node.

Memory stores necessary information forwarded from the controller and deliver necessary information to controller based on controller's instruction.

Controller controls the mobile communication in general. Node B behavior/operation depicted or implied in the FIGS. 4, 5, 6, 7, 8, 9, 10, 11, 12, 13 and 14 are controlled by controller.

Meanwhile, the method and apparatus to receive and transmit data in a mobile communication system according to various exemplary embodiments of the present invention described above may be implemented in an installation data form and be provided in servers or devices in a state in which it is stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

Abbreviation

AM DRB Acknowledged Mode Data Radio Bearer
ARFCN Absolute Radio Frequency Channel Number
BS Buffer Status
BSR Buffer Status Report
BWP Bandwidth Part
C-RNTI Cell Radio Network Temporary Identifier
DCI Downlink Control Information
DL Downlink
DRX Discontinuous Reception
eMBB enhanced Mobile Broadband
FB Frequency Band
FBG Frequency Band Group
FBI Frequency Band Indicator
GNB next Generation Node B
HARQ Hybrid Automatic Retransmission reQuest
HO Handover
LCID Logical Channel ID
LCH Logical Channel
LCP Logical Channel Prioritization
MAC Medium Access Control
MCS Modulation Coding Scheme
MeNB Master eNode B
MME Mobility Management Entity
MSB Most Significant Bit
MSI Minimum System Information
NR Next Radio
PDCCH Physical Downlink Control Channel
PDCP Packet Data Convergence Protocol
PDSCH Physical Downlink Shared Channel
PDU Protocol Data Unit
PRB Physical Resource Block
PSS/SSS Primary Synchronization Signal/Secondary Synchronization Signal
PUSCH Physical Uplink Shared Channel
RAT Radio Access Technology
RB Radio Bearer
RLC Radio Link Control
RLF Radio Link Failure
RMSI Remaining Minimum System Information
RRC Radio Resource Control
RTT Round Trip Time
RV Redundancy Version
Scell Secondary cell
SCS Sub Carrier Spacing SDAP (Service Data Adaptation Protocol)
SDU Service Data Unit
SIB System Information Block
SIBG System Information Block Group
SgNB Secondary gNode B
SPS Semi-Persistent Scheduling
SRB Signaling Radio Bearer
SRS Sounding Reference Signal
TTI Transmission Time Interval
UE User Equipment; interchangeable with Terminal
UL Uplink
UM DRB Unacknowledged Mode Data Radio Bearer
URLLC Ultra Reliable Low Latency

What is claimed is:

1. A method by a terminal, the method comprising:
camping on a NR(Next Radio) cell;
acquiring MIB (Master Information Block);
identifying $1^{st}$ information from the acquired MIB;
determining SCS (subcarrier spacing) to acquire SIB1 (System Information Block 1) based on the $1^{st}$ information and frequency of the NR cell;
acquiring the SIB1 using the determined SCS;
identifying $2^{nd}$ information, $3^{rd}$ information and $4^{th}$ information from the acquired SIB1;
determining SIBs to be requested, based on the $2^{nd}$ information and stored value tags;
determining SIB Groups to be requested, based on the $3^{rd}$ information and the determined SIBs to be requested;

determining a preamble to request the determined SIB Group based on the $4^{th}$ information;
transmitting the determined preamble; and
receiving the requested SIB Group,
wherein the SIB Group is a group of SIBs transmitted together, and
wherein the SIBs are mapped to a SIB Group having same periodicity.

2. The method of claim 1,
wherein first value of the $1^{st}$ information indicates one of $1^{st}$ SCS and $3^{rd}$ SCS depending on the frequency of the NR cell and second value of the $1^{st}$ information indicates one of $2^{nd}$ SCS and $4^{th}$ SCS depending on the frequency of the NR cell.

3. The method of claim 2,
wherein $1^{st}$ SCS, $2^{nd}$ SCS, $3^{rd}$ SCS and $4^{th}$ SCS are different from each other.

4. The method of claim 1,
wherein the $2^{nd}$ information include a value tag of SIB.

5. The method of claim 1,
wherein the $3^{rd}$ information include information on the list of SIBs mapped to a SIB Group.

6. The method of claim 1,
wherein the $4^{th}$ information include the information on the preamble to request SIB Group.

7. The method of claim 6,
wherein the $4^{th}$ information include a start index of the preamble to request SIB Group.

8. The method of claim 7,
wherein the $4^{th}$ information include a specific index to request multiple SIB groups.

9. A terminal in a wireless communication system, the terminal comprising:
a transceiver configured to transmit and receive a signal; and
a controller configured to control the transceiver,
wherein the controller is configured to:
camp on a NR(Next Radio) cell,
acquire MIB (Master Information Block),
identify $1^{st}$ information from the acquired MIB,
determine SCS (subcarrier spacing) to acquire SIB1 (System Information Block 1) based on the $1^{st}$ information and frequency of the NR cell,
acquire the SIB1 using the determined SCS,
identify $2^{nd}$ information, $3^{rd}$ information and $4^{th}$ information from the acquired SIB1,
determine SIBs to be requested, based on the $2^{nd}$ information and stored value tags,
determine SIB Groups to be requested, based on the $3^{rd}$ information and determined SIBs to be requested,
determine a preamble to request the determined SIB Group based on the $4^{th}$ information,
transmit the determined preamble, and
receive the requested SIB group,
wherein the SIB Group is a group of SIBs transmitted together, and
wherein the SIBs of the SIB Group have the same periodicity with the SIB Group.

10. The terminal of claim 9,
wherein first value of the $1^{st}$ information indicates one of $1^{st}$ SCS and $3^{rd}$ SCS depending on the frequency of the NR cell and second value of the $1^{st}$ information indicates one of $2^{nd}$ SCS and $4^{th}$ SCS depending on the frequency of the NR cell.

11. The terminal of claim 9,
wherein $1^{st}$ SCS, $2^{nd}$ SCS, $3^{rd}$ SCS and $4^{th}$ SCS are different from each other.

12. The terminal of claim 9,
wherein the $2^{nd}$ information include a value tag of SIB.

13. The terminal of claim 9,
wherein the $3^{rd}$ information include information on the list of SIBs mapped to a SIB Group.

14. The terminal of claim 9,
wherein the $4^{th}$ information include information on the preamble to request SIB Group.

15. The terminal of claim 14,
wherein the $4^{th}$ information include a start index of the preamble to request SIB Group.

16. The terminal of claim 15,
wherein the $4^{th}$ information include a specific index to request multiple SIB groups.

* * * * *